(12) United States Patent
Eimouri et al.

(10) Patent No.: US 10,747,515 B2
(45) Date of Patent: Aug. 18, 2020

(54) FIELDS HOTNESS BASED OBJECT SPLITTING

(71) Applicant: International Business Machines Corporation, Armonk, NY (US)

(72) Inventors: Taees Eimouri, Tokyo (JP); Kenneth Blair Kent, New Brunswick (CA); Aleksandar Micic, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/257,931

(22) Filed: Jan. 25, 2019

(65) Prior Publication Data
US 2020/0142677 A1 May 7, 2020

Related U.S. Application Data

(60) Provisional application No. 62/755,671, filed on Nov. 5, 2018.

(51) Int. Cl.
*G06F 8/41* (2018.01)
*G06F 9/455* (2018.01)
*G06F 12/02* (2006.01)
*G06F 9/50* (2006.01)

(52) U.S. Cl.
CPC ........ *G06F 8/4442* (2013.01); *G06F 9/45558* (2013.01); *G06F 9/5016* (2013.01); *G06F 12/0269* (2013.01); *G06F 2009/4557* (2013.01); *G06F 2009/45583* (2013.01)

(58) Field of Classification Search
CPC .. G06F 8/4442; G06F 9/45558; G06F 9/5016; G06F 12/0269; G06F 2009/4557; G06F 2009/45583

USPC ......................................................... 717/151
See application file for complete search history.

(56) References Cited

U.S. PATENT DOCUMENTS

| | | | |
|---|---|---|---|
| 7,343,598 B2* | 3/2008 | Chilimbi ............. | G06F 12/0802 711/118 |
| 7,496,909 B2 | 2/2009 | Kuch et al. | |
| 7,650,464 B2 | 1/2010 | Liu et al. | |
| 7,765,534 B2 | 7/2010 | Archambault et al. | |
| 8,261,297 B2* | 9/2012 | Kabanov ................. | G06F 9/449 719/332 |
| 8,789,028 B2 | 7/2014 | Shen et al. | |
| 8,910,135 B2 | 12/2014 | Lai | |
| 10,360,928 B1* | 7/2019 | Brockie ................... | G11B 5/09 |

(Continued)

OTHER PUBLICATIONS

Rubin et al, "An Efficient Profile-Analysis Framework for Data-Layout Optimizations", [Online], 2002, pp. 140-153, [Retrieved from internet on Apr. 4, 2020], <https://dl.acm.org/doi/abs/10.1145/503272.503287> (Year: 2002).*

(Continued)

*Primary Examiner* — Geoffrey R St Leger
*Assistant Examiner* — Zengpu Wei
(74) *Attorney, Agent, or Firm* — Yee & Associates, P.C.

(57) ABSTRACT

Objects are managed in a virtual machine. A frequency of access to fields in objects for an application is identified while the application runs in the virtual machine. An object in the objects is split into a hot object and a cold semi-object based on the frequency of access to the fields in the object as identified while the application runs in the virtual machine, wherein cache misses are reduced from splitting objects based of the frequency of access.

17 Claims, 12 Drawing Sheets

(56) References Cited

U.S. PATENT DOCUMENTS

| | | | | |
|---|---|---|---|---|
| 2004/0215880 | A1* | 10/2004 | Chilimbi | G06F 12/0802 711/118 |
| 2004/0243692 | A1* | 12/2004 | Arnold | G06F 9/5016 709/220 |
| 2005/0177822 | A1* | 8/2005 | Kuch | G06F 9/445 717/155 |
| 2008/0282266 | A1* | 11/2008 | Kabanov | G06F 9/449 719/320 |
| 2011/0154289 | A1 | 6/2011 | Mannarswamy et al. | |
| 2012/0110561 | A1* | 5/2012 | Lai | G06F 8/4442 717/151 |
| 2015/0347296 | A1* | 12/2015 | Kotte | G06F 12/0269 711/103 |
| 2017/0249257 | A1* | 8/2017 | Bonnet | G06F 12/121 |
| 2018/0136842 | A1* | 5/2018 | Kim | G06F 3/064 |
| 2019/0196731 | A1* | 6/2019 | Sapuntzakis | G06F 3/0689 |

OTHER PUBLICATIONS

Kadayif et al, "Quasidynannic Layout Optimizations for Improving Data Locality", [Online], 2004, pp. 996-1011, [Retrieved from internet on Apr. 4, 2020], <https://ieeexplore.ieee.org/stamp/stamp.jsp?tp=&arnumber=1339250> (Year: 2004).*

Eimouri et al, "Using Field Access Frequency to Optimize Layout of Objects in the JVM", [Online], 2016, pp. 1815-1818, [Retrieved from internet on Apr. 4, 2020], <https://dl.acm.org/doi/abs/10.1145/2851613.2851942> (Year: 2016).*

Rubin et al., "An Efficient Profile-Analysis Framework for Data-Layout Optimizations," Computer Sciences Dept. at the University of Wisconsin-Madison, Jan. 2002, pp. 140-153.

Kistler et al., "Automated Data-Member Layout of Heap Objects to Improve Memory-Hierarchy Performance," ACM Transactions on Programming Languages and Systems, vol. 22, No. 3, May 2000, pp. 490-505.

Chilimbi et al., "Cache-Conscious Structure Definition," Proceedings of the ACM SIGPLAN 1999 Conference on Programming Language Design and Implementation, Atlanta, Georgia, May 1-4, 1999, pp. 13-24.

Ilham et al., "Evaluation and Optimization of Java Object Ordering Schemes," Proceedings of the 2011 International Conference on Electrical Engineering and Informatics, Jul. 17-19, 2011, 5 pages.

Truong et al., "Improving Cache Behavior of Dynamically Allocated Data Structures," Proceedings: 1998 International Conference on Parallel Architectures and Compilation Techniques, Oct. 18, 1998, 8 pages.

Hundt et al., "Practical Structure Layout Optimization and Advice," Proceedings of the International Symposium on Code Generation and Optimization, Mar. 26-29, 2006, 12 pages.

Kaman et al., "Structure Layout Optimization for Multithreaded Programs," International Symposium on Code Generation and Optimization (CGO'07),Mar. 11-14, 2007, 12 pages.

Eimouri et al., "Using Field Access Frequent to Optimize Layout of Objects in the JVM," Proceedings of the 31st Annual ACM Symposium on Applied Computing, Pisa, Italy, Apr. 4-8, 2016, pp. 1815-1818.

* cited by examiner

FIELDS HOTNESS BASED OBJECT SPLITTING

CROSS-REFERENCE TO RELATED CASE(S)

This application claims the benefit of U.S. Provisional Application Ser. No. 62/755,671, filed Nov. 5, 2018, entitled "Allocation Context-Based Object Splitting", which is incorporated herein by reference in its entirety.

BACKGROUND

1. Field

The disclosure relates generally to an improved computer system and more specifically to splitting objects based on hotness of fields within the objects.

2. Description of the Related Art

Reference locality is a concept typically used in cache optimization. The premise behind locality is that software programs tend to use memory locations, including data or instructions, near memory locations the respective software programs have used recently. To improve locality, affine data elements should be placed into the same cache blocks. Affine data elements are data elements that often referenced together.

Data layout transformations are categories of optimizations typically used to increase cache performance, mostly by improving reference locality. Data layout optimizations try to rearrange data elements in such a way that related data elements are proximate each other in the cache. The rearrangement of data elements is performed to decrease a number of cache misses resulting from a lack of locality among the related data elements. This type of optimization comprises layouts of global variables, heap, stack and data structures. Object layout optimization seeks to improve cache performance by decreasing a number of cache misses resulting from a lack of locality inside objects.

SUMMARY

The different illustrative embodiments provide a method, system, and computer program product for managing objects in a virtual machine. A frequency of access to fields in objects for an application is identified while the application runs in the virtual machine. An object in the objects is split into a hot object and a cold semi-object based on the frequency of access to the fields in the object as identified while the application runs in the virtual machine, wherein cache misses are reduced from splitting objects based of the frequency of access.

DETAILED DESCRIPTION

Figure 1:
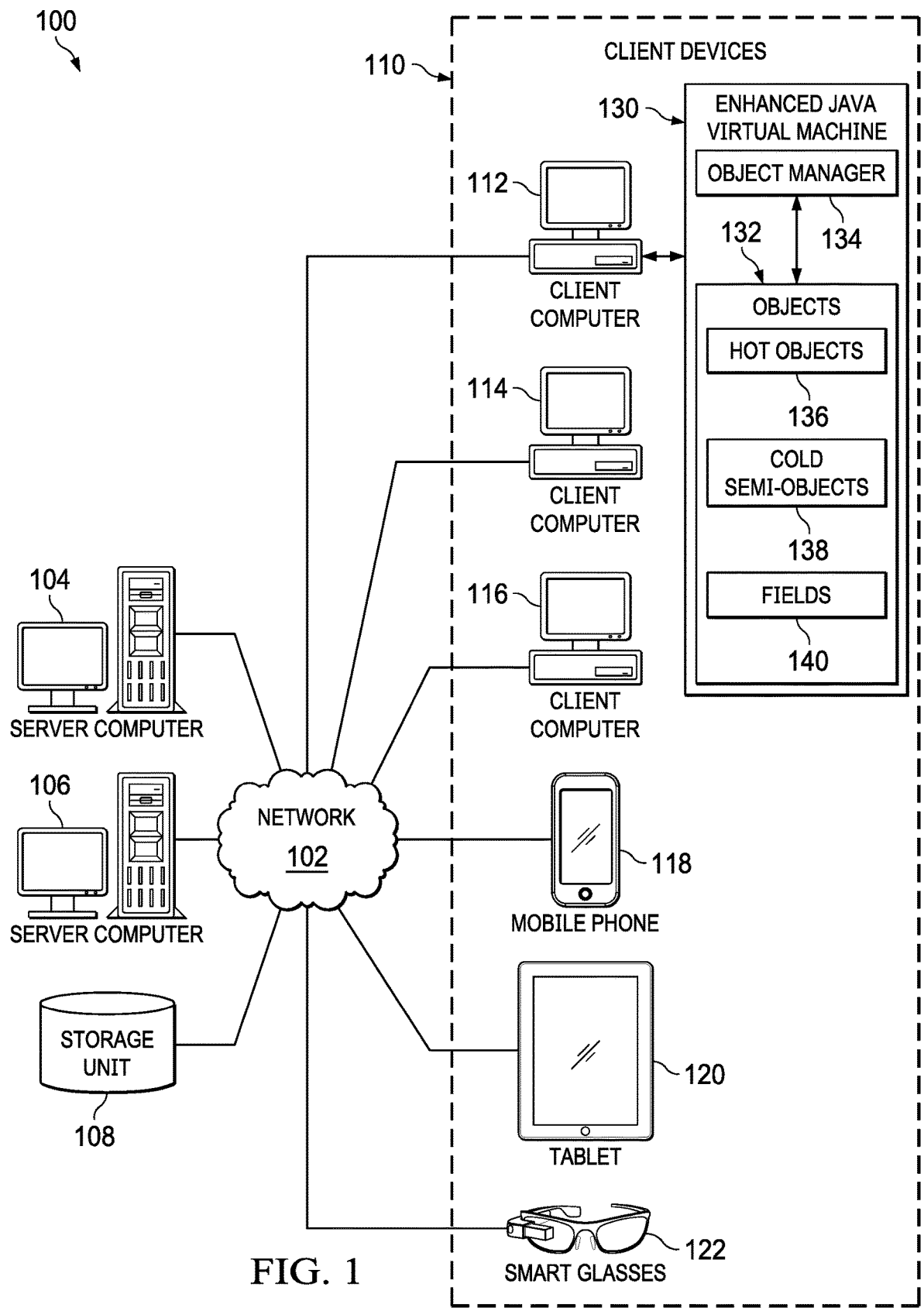
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may process the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that an issue for applications running on a Java platform is that field organization is a responsibility of a respective implementation of a Java virtual machine (JVM). As a result, when a compiler organizes fields inside the objects produced by the compiler, the Java virtual machine also later reorganizes these objects according to a policy of the Java virtual machine. The illustrative embodiments recognize and take into account that fields are usually reordered inside objects based on criteria including hotness. The hotness can be defined as a total number of accesses to a particular field and an affinity, which is a dependency between two fields. Two fields are affine to each other when the two fields are accessed close to each other in time. Based on the hotness or the affinity among fields, the fields are typically reorganized inside objects using one of several techniques.

The illustrative embodiments also recognize and take into account that structure splitting, also referred to as "class splitting", is a technique used to improve cache utilization by placing more objects in the same cache line. The illustrative embodiments recognize and take into account that using the class splitting approach, requires the source code of classes or the bytecode for the classes to change to split the classes into two or more sub-classes. The illustrative embodiments recognize and take into account that when performing class splitting, a given structure is broken into two or more portions and fields are gathered into the portions grouped according to a hotness attributed to respective fields. The illustrative embodiments also recognize and take into account that the hot fields are placed in a root portion of the cache line, which also references a cold portion of the cache line with a pointer. The illustrative embodiments also recognize and take into account that a size of new hot objects (the hot portion of objects) can be less than the size of a cache block enabling more hot objects to be placed in the cache when using this partitioning technique.

The illustrative embodiments recognize and take into account that class splitting is performed before execution time, for example, at a bytecode level. The hotness of the field in an object is based on a frequency at which the field that is accessed. In other words, the number of times that the field is accessed is tracked or observed to determine the hotness of the field. As the field is accessed more often, the field becomes hotter.

This access can include: read, write, or any other type of access. The illustrative embodiments recognize and take into account that class splitting is undesirable because access to source code or bytecode is required. The illustrative embodiments recognize and take into account that this access is not always available or desirable. For example, the illustrative embodiments recognize and take into account that access to Java classes like "string" is unavailable.

The illustrative embodiments recognize and take into account that structure peeling is a technique and is a special case of the structure splitting technique in which structures are split without inserting a link pointer from the hot portion to the cold portion. The illustrative embodiments also recognize and take in account that when structure peeling is used a new pointer or variable is typically created to point to each portion rather than using a link pointer. The illustrative embodiments also recognize and take in account that field reordering is a technique in which fields are reordered according to associated affinity. The illustrative embodiments also recognize and take in account that fields having high affinity are placed in the same cache line to increase spatial locality. The illustrative embodiments recognize and take into account that other techniques for structure layout optimizations can include a technique of instance interleaving.

Thus, it would be desirable to have a method and apparatus that take into account at least some of the issues discussed above, as well as other possible issues. For example, it would be desirable to have a method and apparatus that overcomes a technical problem with optimizing access objects in caches. The illustrative embodiments recognize and take into one account that virtual machines are currently used to manage fields in objects. In one illustrative example, objects are managed in a virtual machine. A frequency of access to fields in objects for an application is identified while the application runs in the virtual machine. An object in the objects is split into a hot object and a cold semi-object based on the frequency of access to the fields in the object as identified while the application runs in the virtual machine, wherein cache misses are reduced from splitting objects based of the frequency of access.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, server computer 104 can also supply enhanced Java virtual machines (JVMs) to client devices 110. "Java" is a registered trademark of Oracle. As another illustrative example, enhanced Java virtual machines can be accessed directly in network data processing system 100 by client devices 110 from storage unit 108 instead of or in addition to server computer 104 or some other server computer. Enhanced Java virtual machines obtained from server computer 104, storage unit 108, or other devices in network data processing system 100 can provide improved cache performance as compared to currently available Java virtual machines.

For example, client computer 112 can run enhanced Java virtual machine 130 such that splitting of objects 132 in enhanced Java virtual machine 130 do not require splitting classes. Instead, in this illustrative example, object manager 134 runs in enhanced Java virtual machine 130 to split objects 132 into hot objects 136 and cold semi-objects 138. The splitting of objects 132 is based on the hotness of fields 140 in objects 132. This hotness is determined in this illustrative example by the frequency at which fields 140 are accessed in objects 132.

In this illustrative example, object manager 134 places hot objects 136 and cold semi-objects 138 into memory locations in a manner that reduces cache misses when running enhanced Java virtual machine 130 on client computer 112. For example, hot objects 136 are placed in memory locations that are used to select objects for cache lines and cold semi-objects 138 into memory locations that are less likely to be selected for placement into a cache line.

In the illustrative example, object manager 134 improves cache utilization by placing more objects in the same cache line. More objects can be placed into a cache line by reducing the size of objects 132 through objects splitting in which a given object is split into two or more pieces in the fields are grouped in these pieces according to the hotness of the fields. These pieces form hot objects 136 and cold semi-objects 138.

As result, hot objects 136 are generated from fields that have a frequency of access that is greater than some selected threshold. This type of selection fields for hot objects 136 increases the likelihood that a cache hit occurs when hot objects 136 are placed into the cache line. Further, by removing colder fields with less access and placing those fields in another object, a cold semi-object, the hot object has a smaller size, allowing for the placement of more hot objects in the cache line. By placing cold semi-objects 138 in selected areas of memory such that fewer cache misses can occur. This process does not require changing source code or bytecodes as with current techniques. Additionally, cold semi-objects 138 also do not have object headers in the illustrative example, reducing the memory footprint. Further, in the illustrative example, a single class present as a result, a single lock is used to lock the object.

Further, at the bytecode level, access to the code for Java classes like "string" is not present. With object manager 134, Java class instances can be optimized in the illustrative examples.

In this illustrative example, enhanced Java virtual machine 130 is a virtual machine in which objects 132 have been split into hot objects 136 and cold semi-objects 138 during allocation of objects based on the frequency of access. In other words, hot objects 136 and cold semi-objects 138 formed from the splitting of objects 132 is a characteristic of enhanced Java virtual machine 130.

The illustration of network data processing system 100 in FIG. 1 is provided as an example of one manner in which an illustrative example can be implemented. This illustration is not meant to limit the manner in which other illustrative examples can be implemented. For example, client computer 112 can include one or more enhanced Java virtual machines in addition to enhanced Java virtual machine 130. As another example, other client devices in client devices 110 and other devices in network data processing system 100 such as server computer 106 can also run enhanced Java virtual machines. As yet another example, other types of enhanced virtual machines can be used in addition to or in place of enhanced Java virtual machines. For example, an enhanced virtual machine can include an enhanced Parrot virtual machine.

Figure 2:
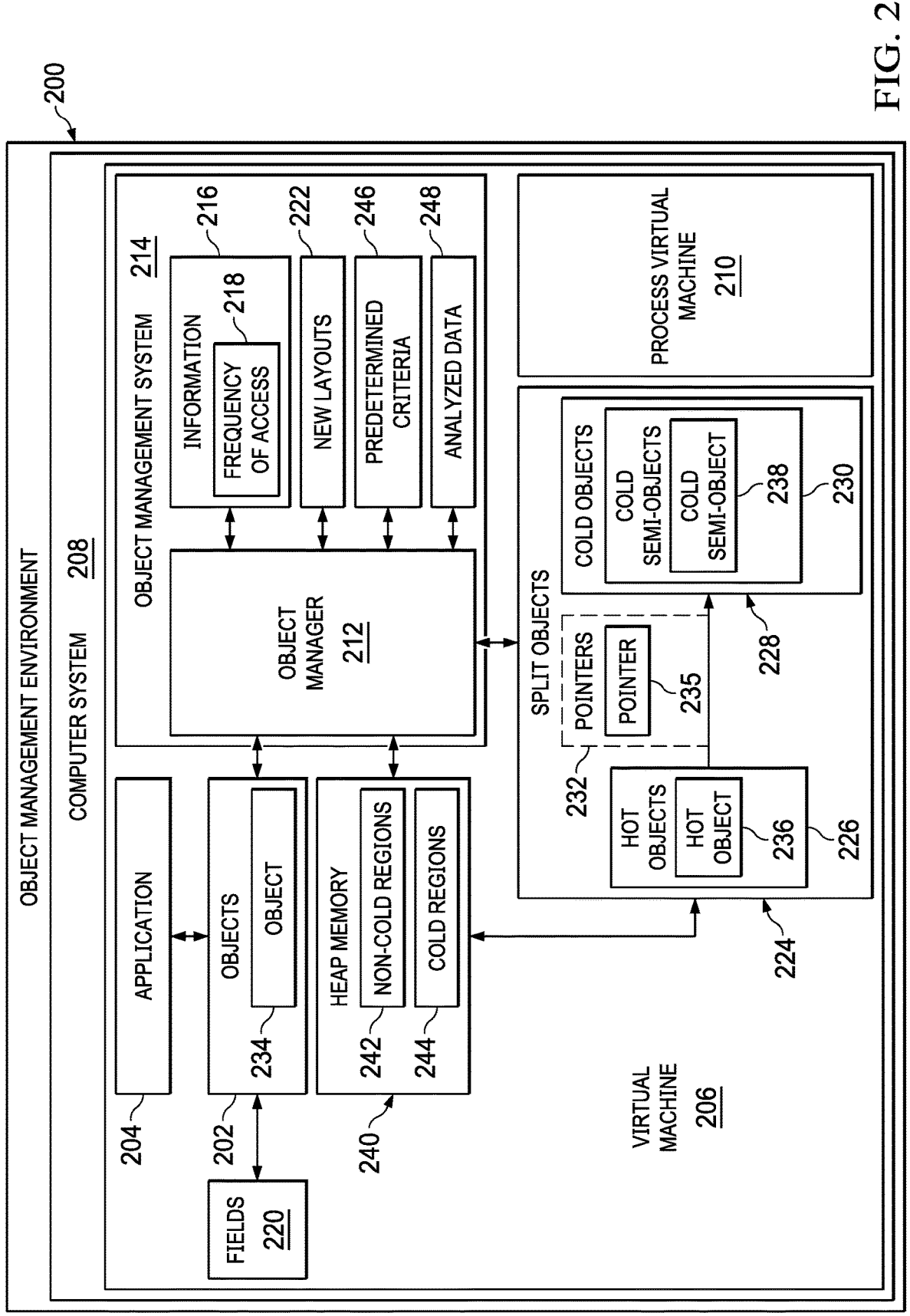
FIG. 2 is a block diagram of an object management environment in accordance with an illustrative embodiment.

With reference now to FIG. 2, a block diagram of an object management environment is depicted in accordance with an illustrative embodiment. In this illustrative example, object management environment 200 includes components that can be implemented in hardware such as the hardware shown in network data processing system 100 in FIG. 1.

In this depicted example, objects 202 are for application 204 running in virtual machine 206 on computer system 208. Each object in objects 202 is an instance of a class in the illustrative example. In this illustrative example, virtual machine 206 is process virtual machine 210. Process virtual machine 210 is an application of a virtual machine and also can be referred to as a managed runtime environment. In this illustrative example, process virtual machine runs as a normal application inside of a host operating system and supports a single process. This type virtual machine provides a platform independent programming environment that abstracts away details of the underlying hardware or operating system.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

In this illustrative example, object manager 212 in object management system 214 operates to increase the performance of computer system 208 when running virtual machine 206. In this illustrative example, the increase in performance can be reduction in cache misses occurring within computer system 208. Object manager 212 is depicted as a functional component in which one or more processes of object manager 212 can be located within virtual machine 206.

In this illustrative example, object manager 212 in object management system 214 monitors the running of application 204 within virtual machine 206. Object manager 212 generates information 216 from monitoring application 204. Information 204 can include, for example, information about classes and their non-static fields for objects 202 for application 204. Information 216 can include at least one of names, types and modifiers, and field access frequency, and other suitable information about classes in their non-static fields. In this illustrative example, non-static fields are tracked because each object in objects 202 has its own copy of non-static fields. This information can include, for example, access barriers, static class information such as class name and the number of non-static fields. Information about non-static fields includes at least one of a name, a type, a modifier, or other information about non-static fields.

Further, information 216 about non-static fields also includes information about the frequency or how often a field is accessed.

Object manager 212 can identify frequency of access 218 to fields 220 in objects 202 for application 204 running in virtual machine 206. For example, object manager 212 can identify a frequency of access to each type of field for fields 220 in objects 202. In identifying the frequency of access to fields, the access is counted for all of the same type of field across the different objects in objects 202. Object manager 212 does not distinguish between different instances of the class in objects 202 in the illustrative example. For example, object manager 212 identifies access is to all double size fields in all other objects 202 rather than on a per object basis.

In this illustrative example, fields 220 of interest are non-static fields. In the illustrative example, a static field belongs to a class and not instances of the class. Non-static fields are copied into the object, which are the instances of the class. Frequency of access 218 is also referred to as access frequency in the illustrative examples.

In other words, the access is identified on a per class basis. As result, all fields for all instances of the class in objects 202 are counted in determining hotness of fields 220.

Information 216 is analyzed by object manager 212 to identify a number of new layouts 222 for objects 202. In the illustrative example, new layouts 222 identify an order of fields in an object as well as what fields are contained in the object. These new layouts can be used to split objects 202 to form split objects 224. As depicted, split objects 224 are hot objects 226 and cold objects 228, which are generated by splitting one or more of objects 202.

In the illustrative example, cold objects 228 can be cold semi-objects 230. Cold semi-objects 230 are cold objects 228 that do not have headers. As depicted, hot objects 226 have pointers 232 to cold semi-objects 230. Hot objects have object headers while cold semi-objects 230 do not have object headers in the illustrative example.

As depicted, object manager 212 splits object 234 in objects 202 into hot object 236 and cold semi-object 238. Hot object 236 has pointer 235 to cold semi-object 238. Cold semi-object 238 does not have a header. As depicted, object manager 212 performs the splitting of object 234 based on frequency of access 218 to fields 220 in object 234 as identified while application 204 runs in virtual machine 206. In other words, some fields in fields 220 are considered hot and are used to form hot object 236. Other fields in fields 220 are considered cold and used to form cold semi-object 238. The selection of hot fields in fields 220 and cold fields in fields 220 can be based on, for example, a threshold value for the number of accesses to a field that is considered hot.

In this illustrative example, application 204 has completed running. Object manager 212 begins the process for splitting objects 202 in response to receiving information 216 for application 204. Information 216 is about particular classes and associated non-static fields including names, types and modifiers, and the frequency of access to the fields. In response to receiving information 216, object manager 212 analyzes information 216 received according to predetermined criteria 246 to create analyzed data 248 identifying frequency of access 218 to each of fields 220.

In the illustrative example, predetermined criteria 246 can be selected to determine the hotness of each field. Further, the hotness of fields is selected to identify how to split objects within memory. Predetermined criteria 246 can include thresholds for the total number of access to each class in each field to determine the hotness of the class and field.

Object manager 212 saves analyzed data 248 about the non-static fields in a memory to identify, new layouts 222 for objects 202 of application 204. New layouts 222 are used to split objects 202 on a subsequent running of application 204.

In this illustrative example, in creating a new layout in new layouts 222, object manager 212 reorders the non-static fields in fields 220 including fields of super classes inside objects 202 into a hot portion containing hot fields and a cold portion containing cold fields using frequency of access 218 to fields 220. In creating the new layout, object manager 212 adds a field, after and adjacent to the hot portion, to maintain an address of a first cold field in the cold portion of the object as pointer to the cold portion when objects are created for the hot portions and cold portions as hot objects 226 and cold semi-objects 230, respectively.

For example, object manager 212 splits object 234 with the new layout using a selected object splitting technique to create hot-object 236 and cold semi-object 238 during an object allocation. Object manager 212 can perform the splitting of object 234 using a number of different object splitting techniques. For example, at least one of a region-based object splitting technique, allocation context-based object splitting technique, or some other object splitting technique can be used.

In this illustrative example, a region-based object splitting technique is one in which separation is at a region level. An allocation context-based object splitting technique is one which the separation is at an allocation context level which can be a non-uniform memory access architecture node.

As a result, running application 204 in virtual machine 206 with split objects 224 occurs with reduced cache misses occurring from splitting objects 202 based of the frequency of access to fields 220 in objects 202. The process of identifying information 216 in object manager 212 can be performed during at least one of an object allocation that allocates objects 202 for application 204 or running of the application 204. Also, the process of splitting objects 202 in object manager 212 can be performed during at least one of an object allocation that allocates objects 202 for application 204 or running of application 204.

In the illustrative example, object manager 212 can split an allocation of hot portions and cold portions of the objects 202 into respective different portions of heap memory 240. The hot portions form hot objects 226 and the cold portions for cold semi-objects 228. The portions are fields 220 in objects 202.

In the illustrative example, when a region-based object splitting technique is used, object manager 212 can allocate hot objects 226 only in non-cold regions 242 in heap memory 240; and can allocate cold semi-objects 230 only in cold regions 244 in heap memory 240. Further, when an allocation context-based object splitting technique is used, cold regions 244 can be selected only from a specific allocation context using non-uniform memory access architecture nodes.

As depicted, object manager 212 can perform a garbage collection for cold regions 244 in heap memory 240 in which cold regions 244 having age zero are collected on each partial garbage collection. In this example, age zero means that those cold regions contain objects that have not yet survived any collections. Further, object manager 212 can perform the garbage collection for remaining cold regions in cold regions 244 when a number of cold regions exceeds a predetermined threshold. For example, the threshold can be selected based on how much heap memory 240 is used by the number of cold regions.

Object manager 212 can be implemented in software, hardware, firmware or a combination thereof. When software is used, the operations performed by object manager 212 can be implemented in program code configured to run on hardware, such as a processor unit. When firmware is used, the operations performed by object manager 212 can be implemented in program code and data and stored in persistent memory to run on a processor unit. When hardware is employed, the hardware may include circuits that operate to perform the operations in object manager 212.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that can overcome a technical problem with reducing cache misses in a manner that avoids having to modify source code or bytecode. As a result, one or more technical solutions can provide a technical effect of allowing a virtual machine to split objects in to hot objects and cold objects without modifying source code or bytecode. One or more technical solutions can provide a technical effect of reducing cache misses by selective placement of the hot objects and cold objects into different regions of memory.

Computer system 208 can be configured to perform at least one of the steps, operations, or actions described in the different illustrative examples using software, hardware, firmware or a combination thereof. As a result, computer system 208 operates as a special purpose computer system in which object manager 212 in computer system 208 enables splitting objects without at least one of splitting classes, modifying source code, or modifying bytecode. In particular, object manager 212 transforms computer system 208 into a special purpose computer system as compared to currently available general computer systems that do not have object manager 212.

In the illustrative example, the use of object manager 212 running on computer system 208 integrates processes into a practical application of managing objects in a virtual machine in a manner that increases the performance of computer system 208. In other words, object manager 212 running on computer system 208 is directed to a practical application of processes integrated into object manager 212 that identify a frequency of access to fields in objects in which the frequency of access is utilized to split the objects into hot objects and cold objects. In this illustrative example, object manager 212 can place the hot objects and cold objects into memory such as a heap memory 240 in a manner that reduces cache misses during the running of application in a virtual machine on the computer system. In this manner, object manager 212 provides a practical application of managing the objects such that the functioning of computer system 208 is improved. The improvement in the functioning of computer system 208 includes at least one of reduced cache misses and reduce use of memory resulting from cold semi-objects not having a header.

Figure 3:
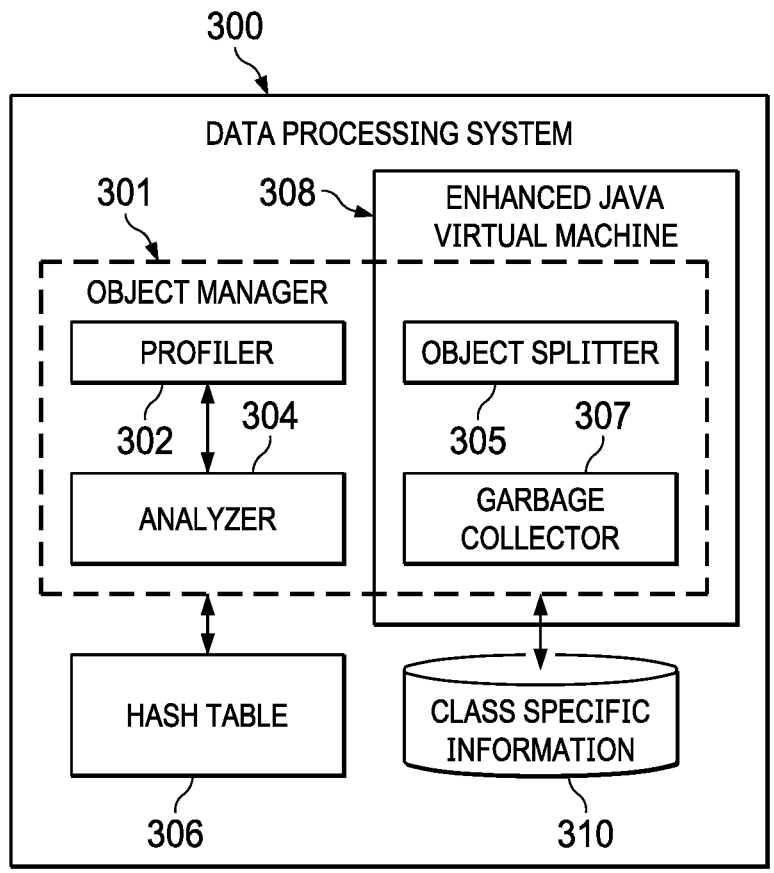
FIG. 3 is a block diagram of a block diagram of a data processing system including an enhanced Java virtual machine in accordance with an illustrative embodiment.

With reference next to FIG. 3, a block diagram of a data processing system including an enhanced Java virtual machine is depicted in accordance with an illustrative embodiment. Data processing system 300 is an example of a data processing system that can be found in computer system 208 in FIG. 2.

As depicted, object manager 301 is an example of one implementation for object manager 212 in FIG. 2. In this illustrative example, object manager 301 includes profiler 302, analyzer 304, object splitter 305, and garbage collector 307. As depicted, object splitter 305 and garbage collector 307 are located within enhanced Java virtual machine 308.

As depicted, profiler 302 and analyzer 304 are located outside of enhanced Java virtual machine 308. Enhanced Java virtual machine 308 is an example of virtual machine 206 in FIG. 2 and enhanced Java virtual machines 116 in FIG. 1.

Profiler 302 provides a capability to obtain information resulting from running an application. The information is associated with particular classes and respective non-static fields. For example, profiler 302 can gather information such as different classes and their fields like their names, types, and the number of accesses to the fields. Hash table 306 provides a capability to store information about field access frequency also referred to as field hotness.

Analyzer 304 provides a capability to filter the information derived from profiler 302 based on predetermined criteria. For example, analyzer 304 determines a number of times as particular field is accessed. Analyzer 304 can identify the hotness of fields based on the number of times the fields are accessed. Whether field is considered sufficiently hot for inclusion in a hot object can be determined using predetermined criteria such as a threshold number of accesses. Additionally, analyzer 304 can also determine a new layout for object based on the hotness of fields identified for the object during running of the application.

In this illustrative example, the analysis performed by analyzer 304 is a static analysis performed after running of the application. In other illustrative examples, analyzer 304 can perform dynamic analysis in which the analysis is performed while the application is run. Further, with dynamic analysis, the splitting of objects, by object splitter 305, can also occur dynamically during the running of the application.

In this illustrative example, enhanced Java virtual machine 308 is a modified version of a conventional Java virtual machine providing a capability including an enhanced garbage collection and object splitting through object manager 301 as will be described in sections that follow. Class specific information 310 provides a capability of storing and maintaining information previously obtained using profiler 302 and analyzer 304. Class specific information 310 can be used to identify new layouts for objects associated with the application in which the new layouts can be used to split objects on subsequent executions of the application.

In the illustrative examples, a selected application of interest is run and information about particular classes and respective associated non-static fields used in the application is gathered by profiler 302 in FIG. 3. In this illustrative example, non-static fields are tracked since each object has its own copy of non-static fields. Information about static class information comprising class name, the number of non-static fields and all required information about the non-static fields of a class, including their names, types and modifiers can be obtained by profiler 302 using access barriers in the Java virtual machine to capture and record the activity of objects.

In addition, information about field access frequency, also referred to as field hotness, is stored in hash table 306. Upon completion of the gathering of the information about the particular classes and respective associated non-static fields used in the application, the information about the particular classes and respective associated non-static fields is saved as class specific information 310 in a file. The information contained in the file is used with subsequent executions of the application to determine new layouts for the objects of the application. The learning phase typically employs a profiling technique in which statistics are obtained and later used in the identification of "hotness" and "affinity." The profiling performed by profiler 302 profiling can be occur during an initial run of an application. The profiling does not need to be performed each time the application is run.

In currently used class splitting approaches, the source code of classes or the bytecode for the classes is changed to split the classes into two or more sub-classes. However, in the illustrative examples, no such change is needed to the source code. The objects are split and classes are not split in the illustrative examples. Illustrative examples introduce a novel approach in which objects can be split at allocation time based on a "hotness" of fields within the objects. Moreover, this technique may be implemented for other managed runtimes other than a Java virtual machine. The following description uses an example embodiment of the disclosed method with respect to a Java virtual machine to perform an object layout optimization process inside the Java virtual machine. In contrast with a conventional class splitting approach, when field reordering optimization is done as a part of the Java virtual machine, the illustrative example reduces overhead by exploiting the role of the Java virtual machine in laying out fields inside objects.

The illustrative examples include a method for splitting Java objects at allocation time that improves cache performance by preventing the cache from being polluted by cold fields of objects. Unlike previous techniques in which classes are split, objects are split into distinct hot parts and cold parts linked by a pointer placed at the end of the hot part in an illustrative embodiment.

In illustrative examples, objects can be split at allocation time, after gathering information about the objects, into hot parts and cold parts in which the hot parts and cold parts are allocated into their respective specific areas of a heap memory. Using the object splitting technique divides instance fields into hot and cold groups and also divides super class fields as well. In this example, the hot parts are hot objects and the cold parts are code semi-objects.

The illustrative examples differ from previous class splitting techniques by placing cold semi-objects in an area of memory called a "cold area" which leads to fewer cache misses. For example, a 100 byte object may not fit into a single CPU cache line. As result, to CPU cache finds may be required to hold this object. As result, one access time and space are required. By splitting the object based on how often fields are accessed within the object, a hot object created from splitting the 100 byte object can fit in the single CPU cache line. The object can be placed in another location such as a cold area.

In contrast with conventional techniques, changes to the bytecode or the source code of associated objects is needed when using an illustrative example. Moreover, in the illustrative example, the cold semi-objects have no header and therefore require a reduced memory footprint when compared to the conventional class splitting techniques. Furthermore, because one class is present, only one lock is used to lock objects in the illustrative examples.

At a bytecode level, there is no access to the code for Java classes, for example, "string" therefore, only application classes can be optimized when using the conventional class splitting techniques. However, in the illustrative examples, Java class instances can also be optimized when they are heavily used by the application.

Objects are currently allocated in contiguous memory locations. Illustrative examples can split some objects into distinct hot parts and cold parts in which these parts form objects, hot objects and cold semi-objects, that are allocated in respective different memory locations as shown later in FIG. 7. These hot parts in a hot object and cold parts in a cold object are also linked to each other using a new pointer in the hot object that points to the location of the cold semi-object.

The illustration of object management environment 100 and the different components in FIG. 2 and FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the hotness of classes can also be determined by object manager 212 in FIG. 2 and object manager 301 in FIG. 3. The hotness of classes can also be used to determine which classes are not optimized because of the overhead optimization. As another example, at least one of profiler 302 or analyzer 304 can be located inside of enhanced Java virtual machine 308.

Figure 4:
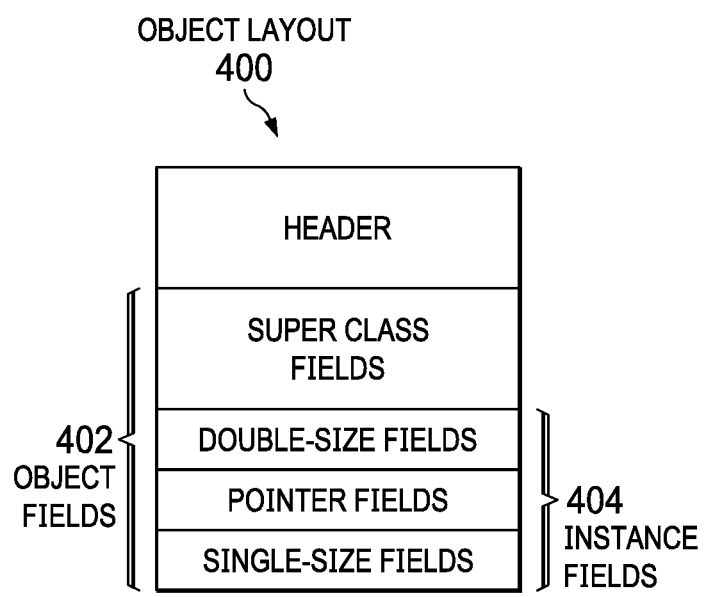
FIG. 4 is a block diagram of a layout of an object in accordance with an illustrative embodiment.
Figure 5:
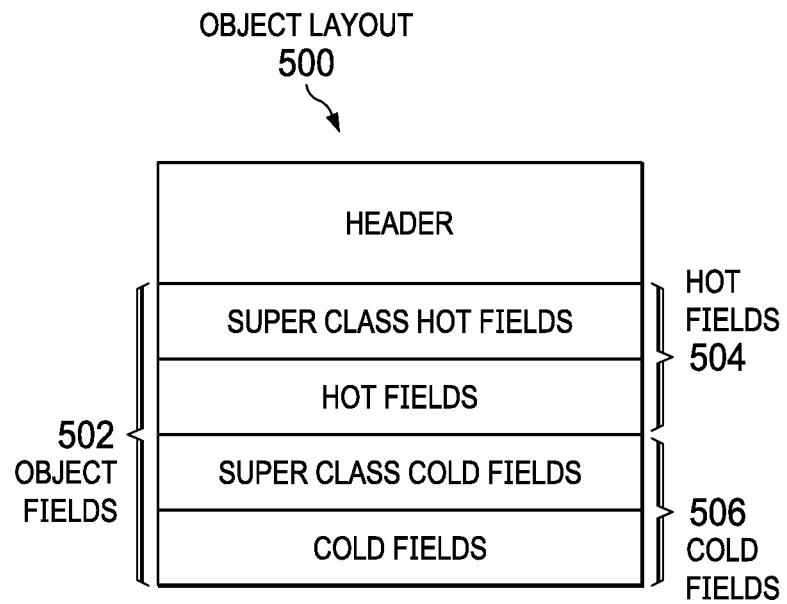
FIG. 5 is a block diagram of an intermediate object layout in accordance with an illustrative embodiment.
Figure 6:
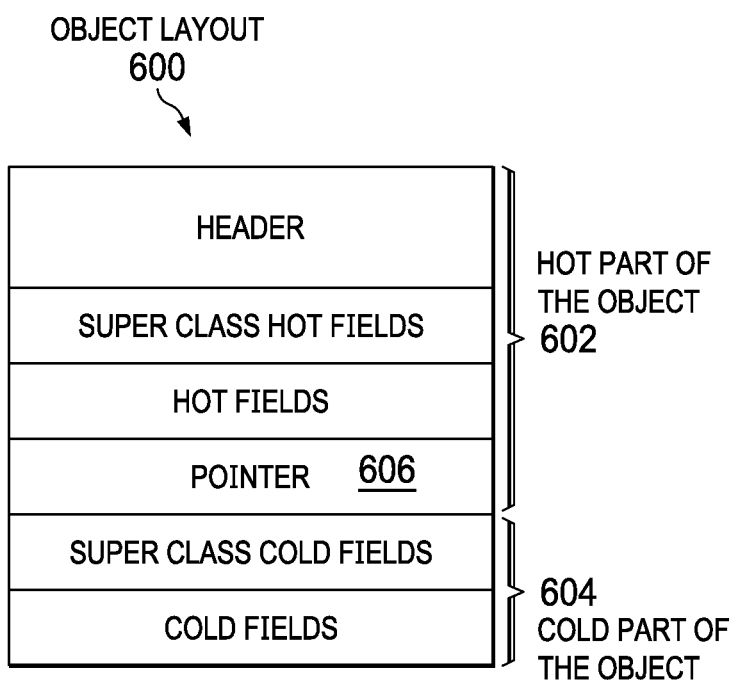
FIG. 6 is a block diagram of a new object layout in accordance with an illustrative embodiment.
Figure 7:
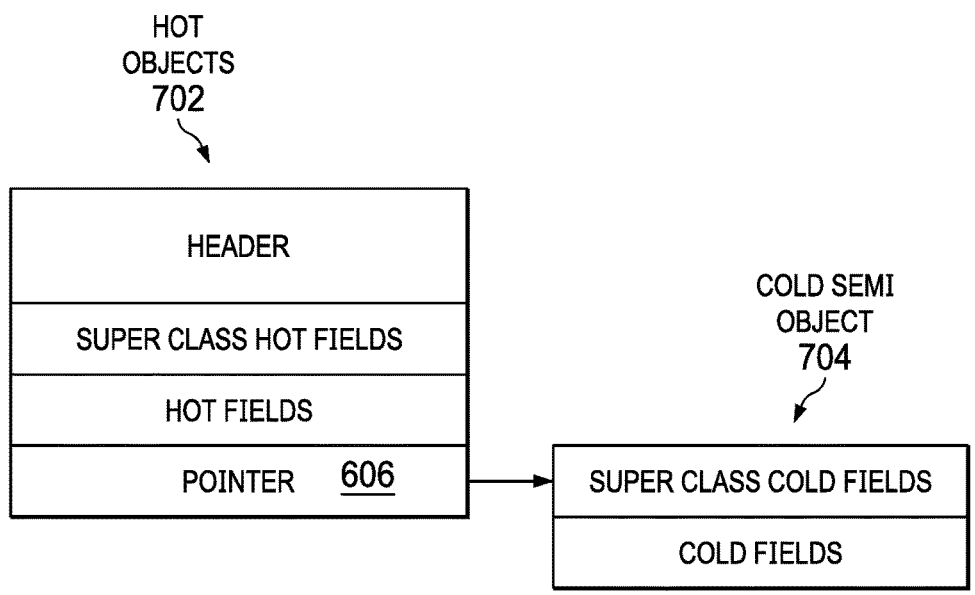
FIG. 7 is a block diagram of an object split into a hot object and a cold semi-object in accordance with an illustrative embodiment.

FIGS. 4-7 depict a process for splitting an object in accordance with an illustrative example. FIG. 4 illustrates layout of an object. FIGS. 5-6 show intermediate layouts that can be created as part of the process for creating a new layout for the object from the layout of the object depicted in FIG. 4 in accordance with an illustrative example. FIG. 7 shows an object split into a hot object and a cold semi-object during object allocation using the new layout in accordance with an illustrative example.

In this depicted example, the layout scheme for objects is specific to a Java virtual machine implementation and is optimized with respect to memory footprint. Fields are laid out inside objects in different groups according to respective size and to minimize the total size of corresponding objects. With reference to FIG. 4 a block diagram of layout of an object is depicted in accordance with an illustrative embodiment. Object layout 400 represents a layout of field for an object used in association with an application that runs in a virtual machine such as a Java virtual machine. Object layout 400 is an example of a layout for object 234 in FIG. 2. Object fields 402 represent fields used within the object. Instance fields 404 represent a set of variables in the object and is a subset of all fields defined by object fields 402. As used here, "a set of", when used with reference to items, is one or more items. For example, a set of variables is one or more variables. Elements of instance fields 404 are placed by the Java virtual machine inside the structure of the object according to the size of the field to decrease requirements for memory.

Turning next to FIG. 5, a block diagram of an intermediate object layout is depicted in accordance with an illustrative embodiment. Object layout 500 is an intermediate layout for the object and represents a modified arrangement of fields shown previously in FIG. 4. Object layout 500 can be created by analyzer 304 in FIG. 3.

Object fields 502 represents all fields used within the object. In this example, hot fields 504 represents a set of fields in the object that have a higher frequency of access relative to the set of fields defined as cold fields 506. Hot fields 504 and cold fields 506 are ordered according to hotness of the particular field within a respective grouping.

In the illustrative examples, objects are split based on hotness as determined by access frequency of the fields in the objects. A predefined rule set can be used to identify objects as candidates for splitting. For example, fields in an object can be ranked from high to low using a computed hotness. In this illustrative example, the computed hotness is the frequency of access to the different fields. In another illustrative example, a threshold may be set in the form of a count of a number of objects, or a percentage of total objects.

As depicted in this figure, fields inside objects selected for splitting are reordered into hot fields 504 and cold fields 506. Fields of super classes are also reordered because all cold fields are to be placed in the cold area.

With reference to FIG. 6, a block diagram of a new object layout is depicted in accordance with an illustrative embodiment. Object layout 600 represents a further modified arrangement of fields shown previously in FIG. 5 that forms a new layout that can be used to split objects. Object layout 600 can be created by analyzer 304 in FIG. 3.

As depicted, the hot part 602 of the object is a set of fields as in hot fields 504 in FIG. 5. The cold part 604 of the object is a set of fields as in cold fields 506 in FIG. 5.

In this illustrative example, pointer 606 is a newly added field to object layout 600. Pointer 606 referred to as coldPTR is added after hot part of the object 602, adjacent to the set of hot fields and provides an address of the first cold field in the set of cold fields in the previously defined cold area of the object, cold part 604 of the object. Pointer 606 is a pointer that will point to the hot object when object is split into hot object and; object. Object layout 600 can be used by object splitter 305 in FIG. 3 to split an object into a hot object and a cold semi-object.

With reference to FIG. 7, a block diagram of an object split into hot object and a cold semi-object is depicted in accordance with an illustrative embodiment. Hot object 702 and cold semi-object 704 are created by splitting an object using object layout 600 in FIG. 6. This splitting of the object can be performed by object splitter 305 in FIG. 3.

Hot object 702 includes elements of the object comprising the hot part of the object in hot part 602 in object layout 600, which also contains pointer 606 in FIG. 6. However, cold semi-object 704, which contains the cold part of the object in cold part 604 in object layout 600 in FIG. 6. Hot object 702 may be located in a different memory location than cold semi-object 704 in which the location is selected to increase cache performance.

Figure 8:
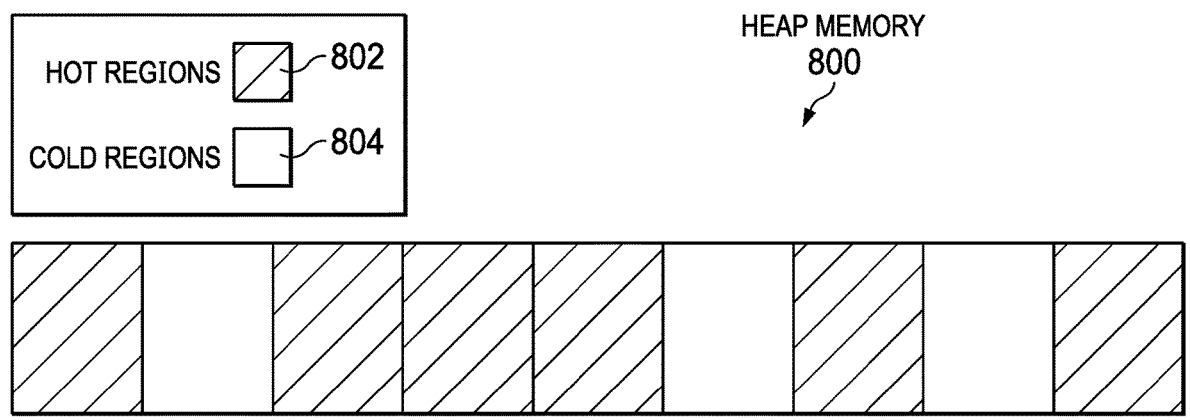
FIG. 8 is a block diagram of a heap memory in accordance with an illustrative embodiment.

With next reference to FIG. 8, a block diagram of a heap memory is depicted in accordance with an illustrative embodiment. The illustrative examples employ a balanced garbage collection (BGC) policy to manage objects in heap memory 800. Balanced garbage collection divides memory into regions with allocation performed in these regions. Although balanced garbage collection is used in the illustrative examples other types of different garbage collection (GC) policies can be used.

In one illustrative example, some regions of heap memory 800 are hot regions 802. Hot regions 802 can be designated in heap memory 800 base an access frequency. Other regions in heap memory 800 are cold regions 804.

Hot parts of the objects are allocated in hot regions as hot objects and cold parts of the objects are allocated in cold regions as cold semi-objects using a region-based object splitting approach in this example. As depicted in this example, cold regions 804 are distributed throughout the heap memory 800.

Figure 9:
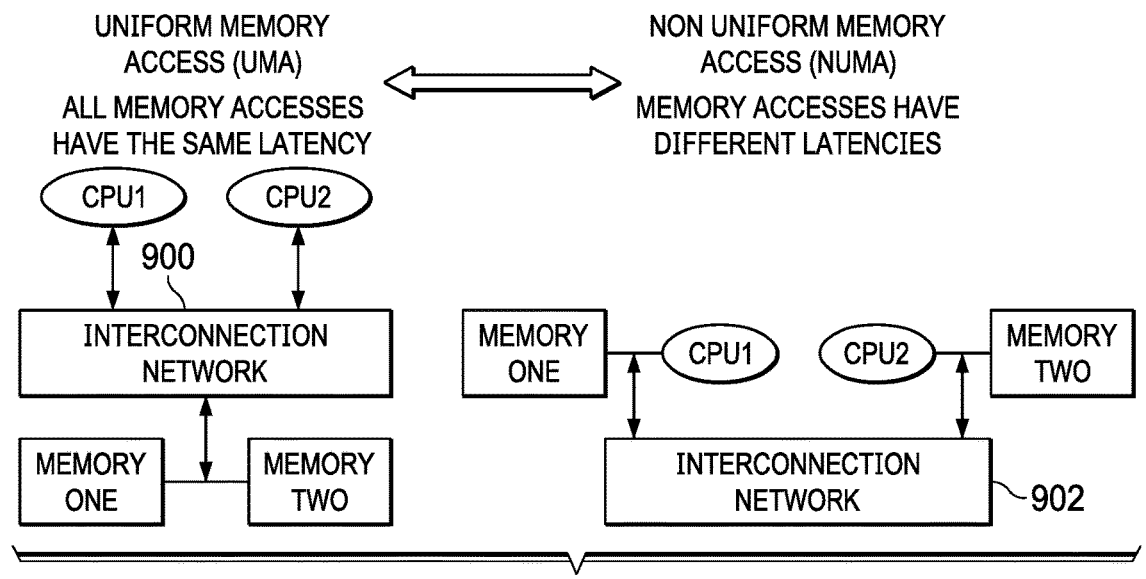
FIG. 9 is block diagram of memory access types in accordance with an illustrative embodiment.

Turning to FIG. 9, a block diagram of types memory access architectures is depicted in accordance with an illustrative embodiment. As depicted, uniform memory access (UMA) node 900 and non-uniform memory access (NUMA) node 902 is shown in FIG. 9. Memory access using non-uniform memory access node 902 differs from that of uniform memory access node 900. These are just examples nodes and other illustrative examples can include other numbers of CPUs and memories using the architectures shown in this figure.

In the illustrative example, non-uniform memory access is a computer memory architecture for multiprocessing. With this type of architecture, memory access time depends on the memory location relative to the processor. Under non-uniform memory access architecture, a processor can access its own local memory faster than nonlocal memory. A number of non-uniform memory access properties are used in the illustrative examples including a non-uniform memory access (NUMA) node.

In the illustrative example, a non-uniform memory access node comprises a group of resources including central processing units (CPUs), memory, and other hardware; connection links including connection bus, bus interconnect, and interconnect; and a virtual address space shared across the nodes. Differing access latency characteristics of memory of non-uniform memory access nodes can be used in a placement of hot parts and cold parts of the objects when split to form hot objects and cold semi-objects.

Figure 10:
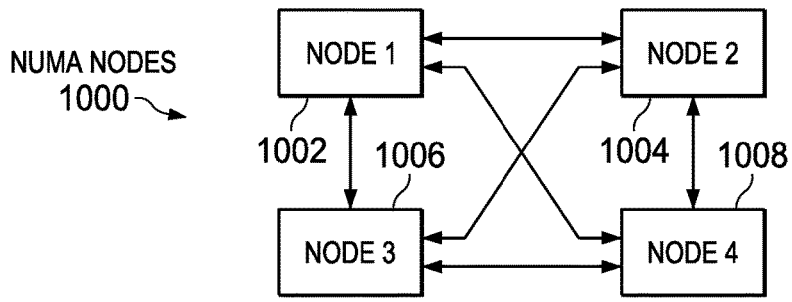
FIG. 10 is a block diagram of a non-uniform memory access nodes is depicted in accordance with an illustrative embodiment.

With reference to FIG. 10, a block diagram of non-uniform memory access nodes is depicted in accordance with an illustrative embodiment. As depicted, a set of non-uniform memory access (NUMA) nodes 1000 comprise node 1 1102, node 2 1104, node 3 1106, and node 4 1108. The non-uniform memory access nodes are initially capable of communicating directly with each other. Non-uniform memory access node 902 in FIG. 9 is an example a node that can be used to implement these nodes.

In the illustrative example, an object splitting technique (OST) can be implemented using either of two different approaches. A first approach is referred to as Region based object splitting technique, which distributes cold regions in memory next to non-cold regions. Cold regions are the regions from which cold allocation is performed. Non-cold regions are those regions from which non-cold allocation is performed. In a second approach, allocation takes advantage of the non-uniform memory access architecture.

Figure 11:
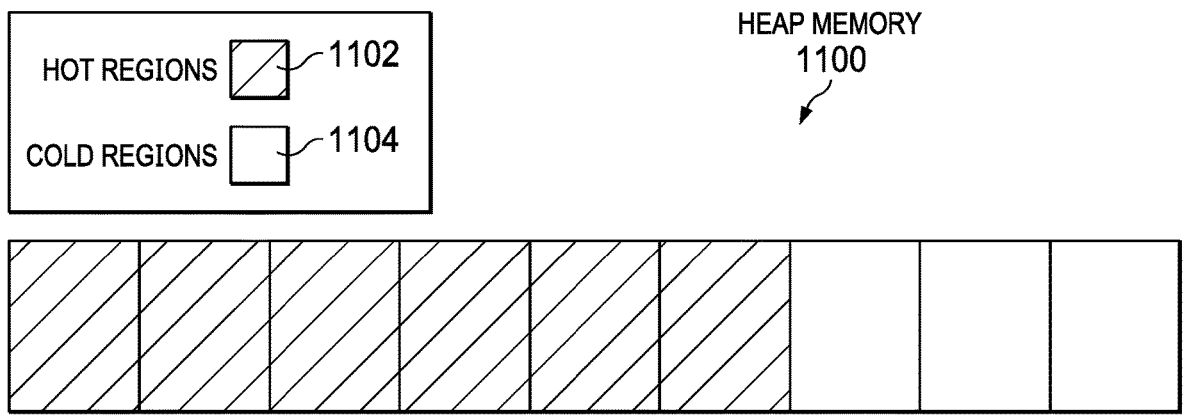
FIG. 11 is a block diagram of a heap memory in accordance with an illustrative embodiment.

Turning to FIG. 11, a block diagram of a heap memory is depicted in accordance with an illustrative embodiment. In an illustrative example using a Java virtual machine, each non-uniform memory access node is represented by an allocation context (AC) under a balanced garbage collection model having a non-uniform memory access option enabled. Each allocation context contains sets of regions of memory and threads that exist on a respective owner node. In addition to one allocation context per node in balanced garbage collection, a common allocation context is present for a main thread and regions that reach a respective maximum age. This technique is referred to as an allocation context-based object splitting approach. The allocation context-based object splitting approach reduces a work load of nodes by placing cold semi-objects from the cold parts on a separate node. Since all regions belonging to one allocation context are physically adjacent in heap memory 1100, heap memory 1100 is split into areas of hot regions 1102 and cold regions 1104. Therefore, when using allocation context-based object splitting, heap splitting is performed at the allocation context level. A number of these allocation contexts are considered to be hot regions 1102 while a number of different allocation context are considered to be cold regions 1104. Furthermore, cold regions 1104 are centralized in an area of heap memory 1100 when using the allocation context-based object splitting approach.

Figure 12:
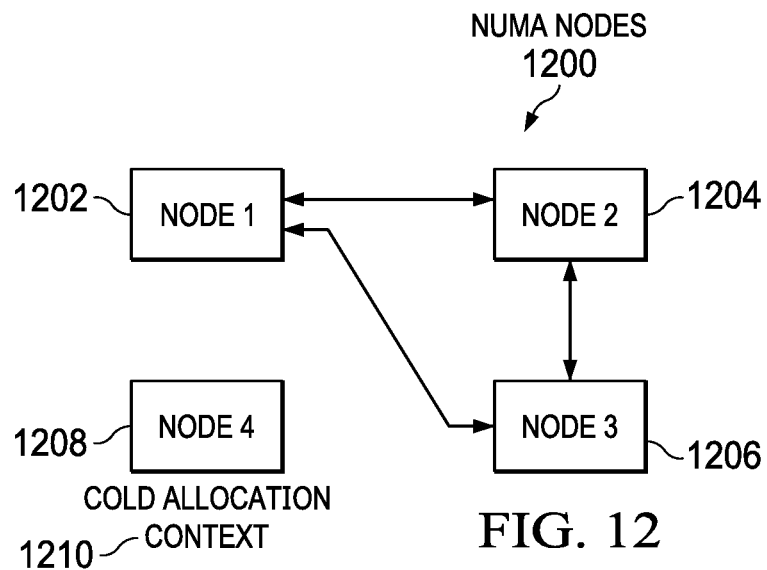
FIG. 12 is a block diagram of non-uniform memory access nodes in accordance with an illustrative embodiment.

With reference next to FIG. 12, a block diagram of non-uniform memory access (NUMA) nodes is depicted in accordance with an illustrative embodiment. As illustrated, non-uniform memory access (NUMA) nodes 1200 comprises node 1 1202, node 2 1204, node 3 1206, and node 4 1208. In this illustrative example, non-uniform memory access (NUMA) nodes 1200 are not capable of communicating directly with each other. As depicted, node 4 1208 contains cold allocation context 1210.

By default, threads are allocated from native allocation contexts as long as there are free regions. When there are no free regions in a native allocation context, a region is borrowed from another allocation context. Eventually, when borrowed regions become free, those borrowed regions are returned to an original owning allocation context. In this example, the regions can migrate, although temporarily, from one allocation context to another allocation context, but the threads do not migrate.

In the illustrative examples, this relationship can be changed at the initialization step. For example, an appropriation allocation context can be modified such that threads from hot contexts can only appropriate regions from hot contexts and threads from cold contexts can only appropriate regions from cold contexts. With minimal runtime overhead, a thread from one of the hot allocation contexts cannot appropriate regions from the cold allocation contexts and vice versa. In addition, the common allocation context cannot access regions belonging to cold contexts. As a result, threads from hot contexts cannot appropriate regions from cold ones and vice versa.

To accelerate object allocation by threads, each thread has a thread local heap (TLH), which is part of the heap memory from which a thread can allocate without using any lock. In the illustrative example, two thread local heaps are used for each thread in which one thread local heap is used for regular allocation and the other thread local heap is used for cold allocation. A hot thread local heap is allocated from the hot regions and a cold thread local heap is allocated from the cold regions.

The illustrative example does not perform object splitting on instances of all classes. Only some classes are selected as hot classes and identified as candidates for splitting all associated instances. To distinguish these candidate classes, a bit in classFlags is set. The classFlags is a 32-bit flag in a Java virtual machine class data structure from which only the first five bits are currently used. In the illustrative example, an eighth bit is used as a coldFlag to indicate whether respective instances of the class are split.

Figure 13:
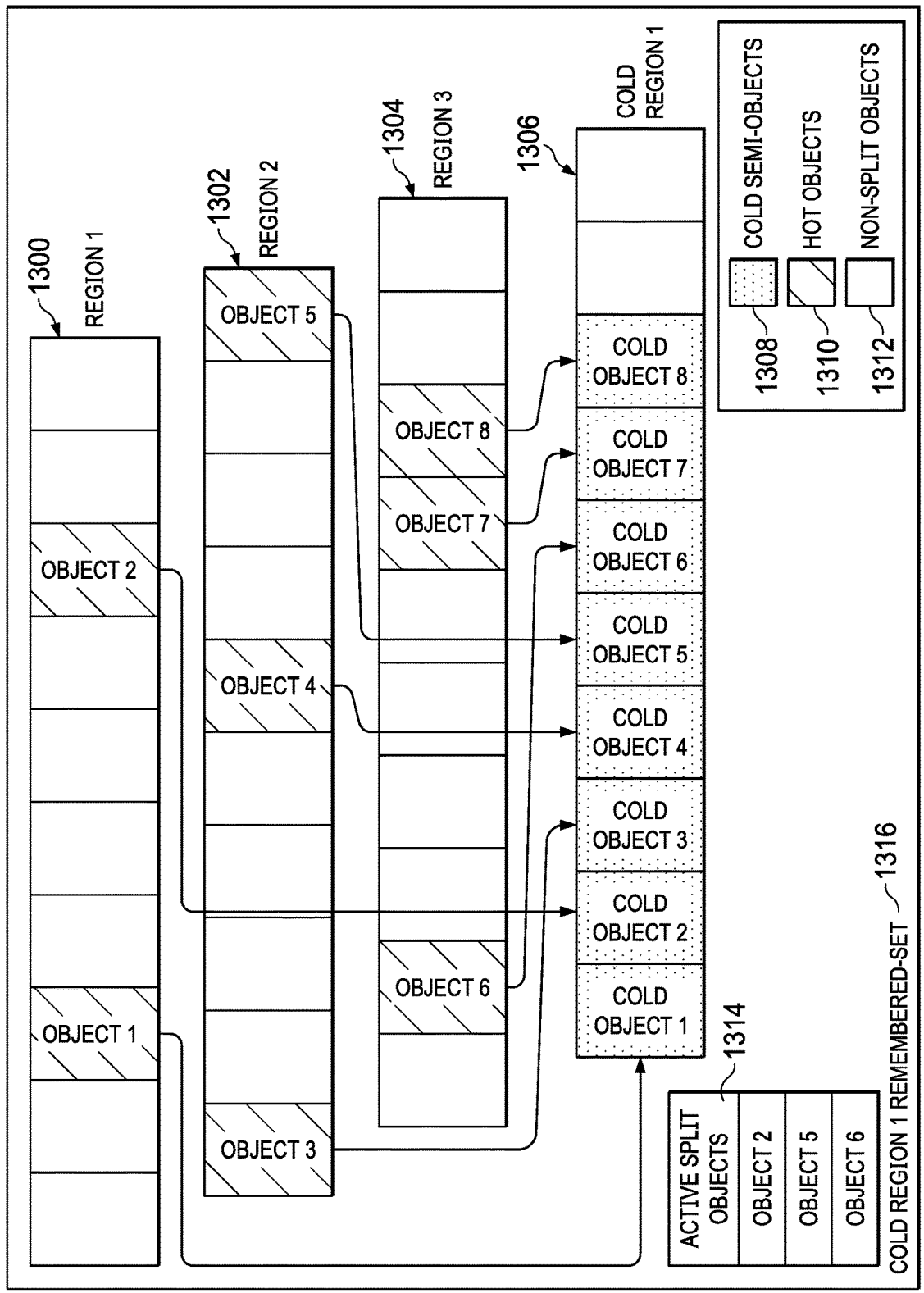
FIG. 13 is a block diagram of a memory data structure in accordance with an illustrative embodiment.

In FIG. 13, a block diagram of a memory data structure is depicted in accordance with an illustrative embodiment. The memory data structure is a heap memory. From a garbage collection perspective, cold regions, for example, cold region 1 1306 is treated differently because cold semi-objects 1308 in these regions have no headers. As a result, the conventional garbage collection is modified to process these cold regions. Using the modified garbage collection, cold eden regions, those regions with age zero, are garbage collected at every partial garbage collection (PGC). Remaining cold regions are garbage collected when a number of cold regions exceeds a predetermined threshold.

As a result, at each global marking phase (GMP), which occurs before sweeping, a cold remembered-set is created for each of the cold regions that contain pointers to live split objects, for example, active split objects 1314, with a cold part residing at that region. In other words, illustrative example if a hot object is marked, the cold semi-object pointed to by the hot object is also marked.

The structure of a cold remembered-set is shown in the form of cold region 1 remembered-set 1316. This cold remembered-set is used in subsequent partial garbage collections to locate the cold portions of the live objects, for example objects in Region 1 1300, Region 2 1302 and Region 3 1304, and to update hot objects 1310 after moving an associated cold part. In the illustrative example, increased efficiency is present each cold remembered-set keeps information of only those cold semi-objects in the region that survived global marking. In the illustrative example, few of these objects are present. However, when the cold remembered-set exceeds a predetermined threshold during the global marking, this region can be overflowed. The overflowed region is ignored for the rest of global marking, and then, re-tried on the next global marking phase. Thus, processing of the cold remembered-sets used in embodiments of the disclosed method is very similar to a process used by a conventional Java virtual machine with the regular remembered-sets.

Figure 14:
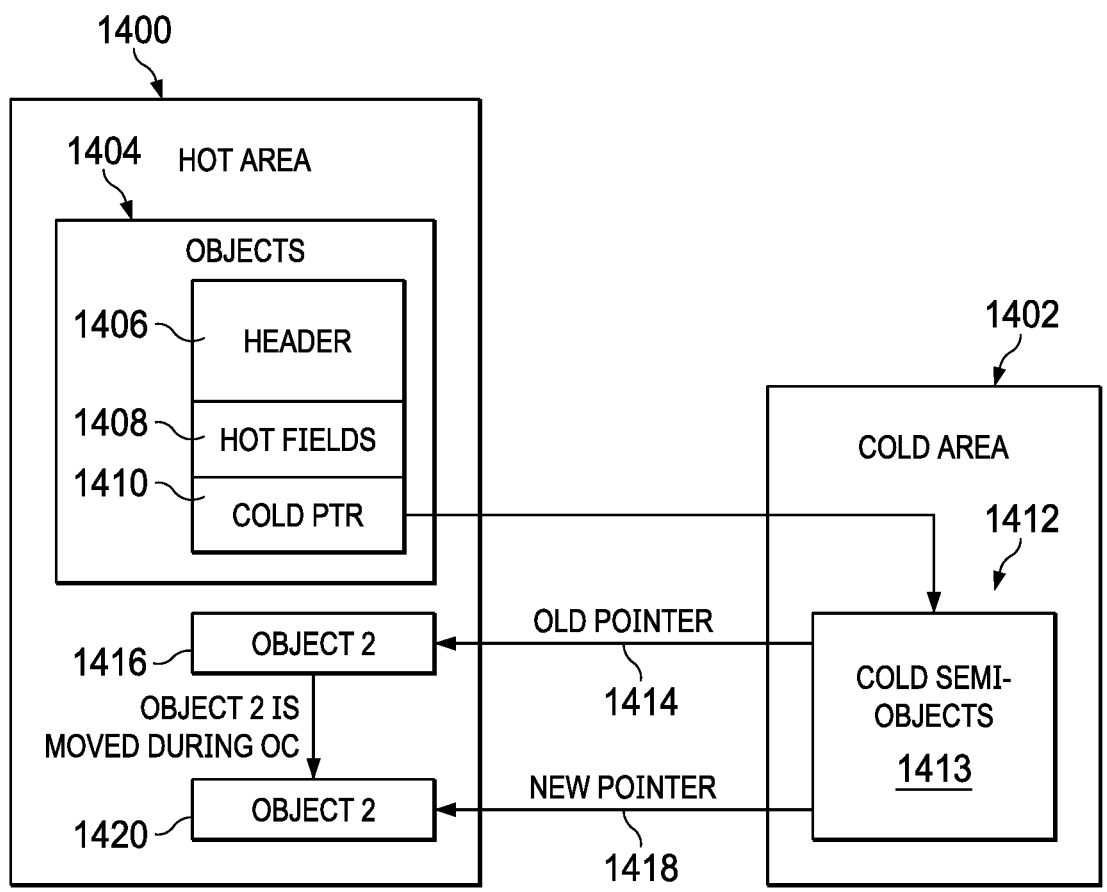
FIG. 14, a block diagram dataflow in updating a memory data structure is depicted in accordance with an illustrative embodiment.

With reference now to FIG. 14, a block diagram dataflow in updating a memory data structure is depicted in accordance with an illustrative embodiment. While cold regions are excluded from direct marking, some of the fields in these regions are references to other objects, for example, objects allocated in the hot regions. As a result, references in the cold regions are updated during every time garbage collection is performed to point to the correct object.

Hot area 1400 includes a data structure containing objects 1404 further comprising header 1406, field 1408 and field 1410. Field 1410 contains coldPTR, which points to a first element of cold semi-objects 1412 within cold area 1402. One element of cold semi-objects 1412 contains old pointer 1414 in field 1413 which points to object 2 1416 at a location prior to moving due to garbage collection. Old pointer 1414 in field 1413 is updated as new pointer 1418 to point to object 2 1420 at a new location after moving due to garbage collection (GC). The references from cold fields in the cold area 1402 are updated during garbage collection to point to the correct object in hot area 1400.

In the illustrative example, object splitting can reduce the number of cache misses as compared to a conventional Java virtual machine with a disabled Just In (JIT) compiler. However, implementation of embodiments of the disclosed method incur tradeoffs when compared with conventional Java virtual machine processing. Distinguishing and accessing cold fields requires allocation of negative offsets to the cold fields. This action conflicts with JIT implementations causing disabling the JIT. Turning off JIT, along with implementation overhead slows execution time of the application.

Figure 15:
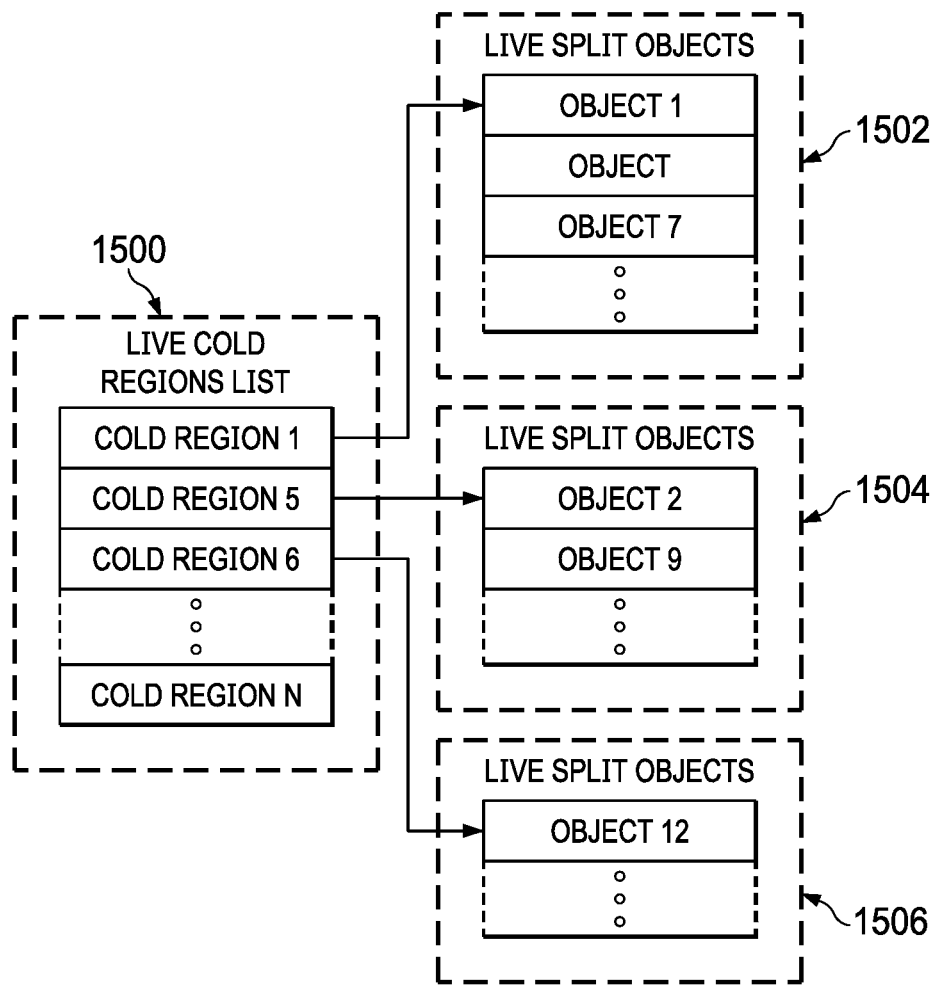
FIG. 15 is a block diagram of a memory data structure in accordance with an illustrative embodiment.

With reference to FIG. 15, a block diagram of a memory data structure is depicted in accordance with an illustrative embodiment. Because of the importance of garbage collection, the illustrative examples can implement a new cold garbage collection cycle that takes advantage of the object splitting. Reclaiming memory of objects is one responsibility of a garbage collection process. During the collection process, live objects are found and typically moved to reduce fragmentation. Once an object is moved, all other objects that have a reference to the moved object are updated. Because the only reference to each of the cold semi-objects in the cold regions is the reference from an associated hot object, the pointer in the hot object is updated after moving the cold semi-object.

However, there could be some references from cold semi-objects to other hot objects in the non-cold regions. Also, using the header of an object, useful information about the object, for example, an associated type and size, can be obtained. This information is used by garbage collection processes to handle the object especially during the garbage collection. To reduce a memory footprint, headers are not placed in the cold regions. Therefore, the cold regions cannot be collected by a default garbage collection process.

As a result, a conventional garbage collector can be modified to handle the split objects, for example, live split objects 1502, live split objects 1504 and live split objects 1506, particularly the cold semi-objects in the cold region. For example, some fields in the cold regions, for example, cold region 1, cold region 5, cold region 6, cold region n, contained in live cold regions list 1500 are references to other objects, for example, objects allocated in the hot regions. As a result, these fields have to be updated during garbage collection, as required, to point to a valid object as shown in FIG. 14.

In performing a cold garbage collection, the illustrative example takes into account that the partial garbage collection collects non-cold eden regions, and those are the only hot regions that may have references to the eden cold regions. In the illustrative example, the eden regions in the heat is the pool from which memory is initially allocated for most objects. Thus, during each cold partial garbage collection (cPGC) only eden cold regions are collected. The local garbage collection collects all (non-cold) regions, so during each cold global garbage collection (cGGC) all cold regions are collected. However, postponing collection of non-eden cold regions, until a next global garbage collection is missing an opportunity to free up space earlier. However, the cold regions typically occupy a relatively small number of regions therefore the cold regions have a lower priority, relative to the hot regions, to be collected.

Approaches to find live objects in partial garbage collection and global garbage collection are different. While an application is running between two partial garbage collections, liveness information is not present for objects in the eden regions. During a partial garbage collection cycle, this information is built for the eden regions, and is rebuilt for any other regions in the collection set. Live objects in all regions in the collection set (eden and non-eden) are found based on recursive tracing starting from the roots. Once the object is marked or moved, an associated mark bit is set. However, global garbage collection includes a global marking operation. Marking in global garbage collection runs in stop-the-world (STW) mode, which also includes sweep and compact operations during the same stop-the-world period.

To perform garbage collections on cold regions, the cold regions are excluded from being marked by a collector of a conventional virtualization. As a result, the Balanced garbage collection only collects the non-cold regions and updates references in the cold regions after moving non-cold objects.

To implement cold partial garbage collection, at the end of each partial garbage collection cycle, all live objects in the non-cold eden regions are examined to find split objects and to move a respective cold part to a group of cold regions called tenured cold regions. Tenured cold regions are garbage collected only during the cold global garbage collection cycles.

To perform the cold global garbage collection, which examines all cold regions including tenured ones, remembered-sets are simulated. By default, each region has a data structure called a remembered-set, which includes a list of all other objects outside of the region that have a reference to objects residing in the region. To implement cold global garbage collection, each cold region is given a semi-remembered-set that contains pointers to live split objects that have a cold part residing in that region. The semi-remembered-set for each cold region is built during global marking as a part of either global marking phase or level garbage collection. The structure of the semi-remembered-set is shown in cold region 1 remembered-set 1316 in FIG. 13.

The cold global garbage collection is performed within a global garbage collection and just after the sweep is completed, following completion of global marking because this is when a maximum amount free memory is present and a need to evacuate cold semi-objects to new memory locations is present. There is no need to wait past that garbage collection completion, because hot parts of split objects will move making a semi-remembered-set invalid.

Therefore, during the global marking, live cold regions list 1500 is created containing all live cold regions, in which the cold regions have at least the cold semi-object of one live object. Each entry has a pointer to a corresponding semi-remembered-set containing pointers to live split objects corresponding to that cold region. This list is removed after a cold garbage collection. Each entry in this semi-remembered-set is used in the cold global garbage function to update the hot objects after moving corresponding cold parts.

Figure 16:
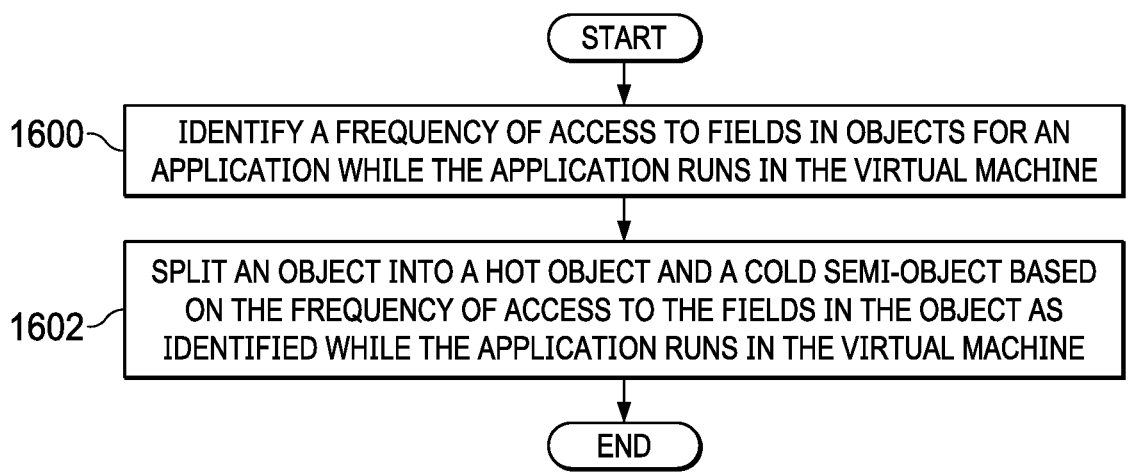
FIG. 16, a flowchart of a process for managing objects in a virtual machine in accordance with an illustrative embodiment.

Turning next to FIG. 16, a flowchart of a process for managing objects in a virtual machine is depicted in accordance with an illustrative embodiment. The process in FIG. 16 can be implemented in hardware, software, or both. When implemented in software, the process can take the form of program code that is run by one of more processor units located in one or more hardware devices in one or more computer systems. For example, the process can be implemented in object manager 212 in computer system 208 in FIG. 2.

The process begins by identifying a frequency of access to fields in objects for an application while the application runs in the virtual machine (step 1600). The process splits an object into a hot object and a cold semi-object based on the frequency of access to the fields in the object as identified while the application runs in the virtual machine (step 1602). The process terminates thereafter. With this process, cache misses can be reduced from splitting objects based of the frequency of access.

Figure 17:
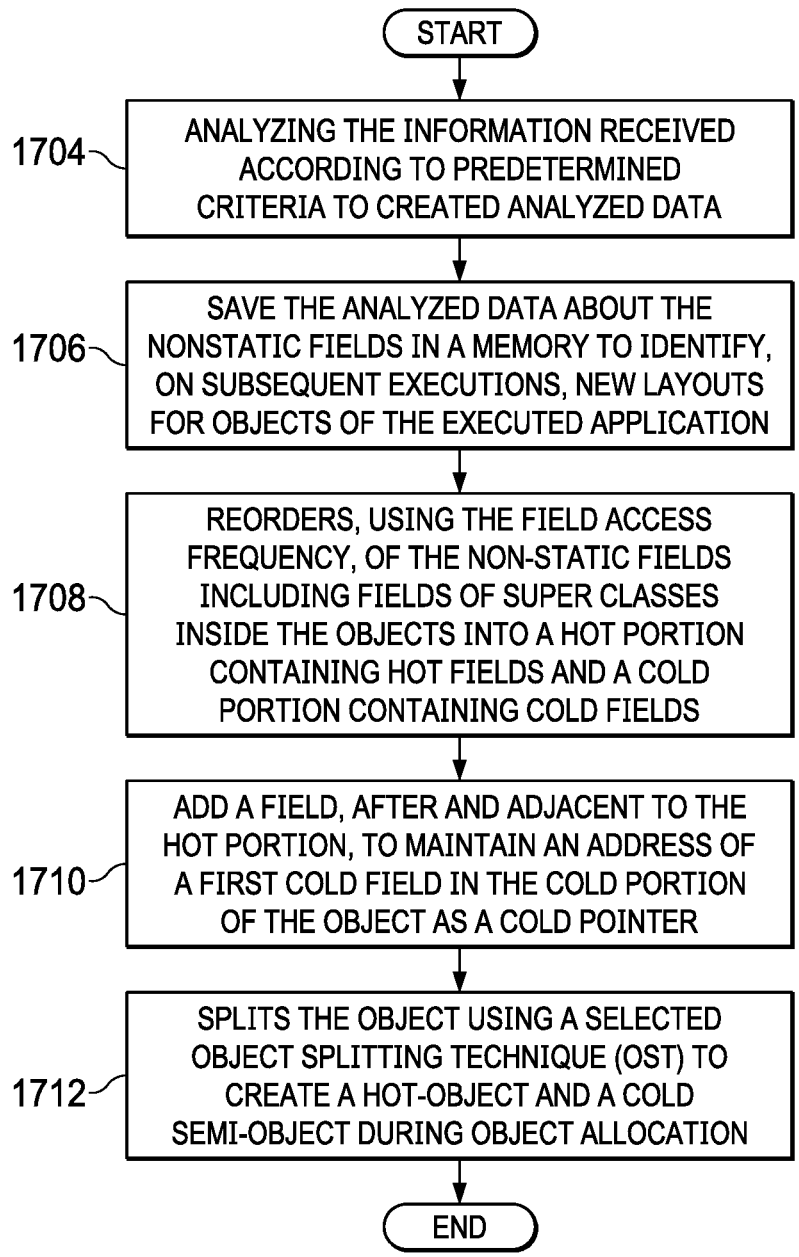
FIG. 17 is a flowchart of process for splitting objects in accordance with an illustrative embodiment.

With reference next to FIG. 17, a flowchart of a process for splitting objects is depicted in accordance with an illustrative embodiment. The process in this figure can be implemented in object manager 212 in for splitting objects 202 in virtual machine 206 in FIG. 2. This process can be an example of one implementation for step 1602 in FIG. 16.

The process begins by analyzing the information received according to predetermined criteria to created analyzed data (step 1704). As depicted, step 1704 is initiated in response to receiving information, for an executed application, about particular classes and associated non-static fields including names, types and modifiers, and field access frequency collected in a hash table.

The process saves the analyzed data about the non-static fields in a memory to identify, on subsequent executions, new layouts for objects of the executed application (step 1706). The process reorders, using the field access frequency, of the non-static fields including fields of super classes inside the objects into a hot portion containing hot fields and a cold portion containing cold fields (step 1708).

The process adds a field, after and adjacent to the hot portion, to maintain an address of a first cold field in the cold portion of the object as a cold pointer (step 1710). The process splits the object using a selected object splitting technique (OST) to create a hot-object and a cold semi-object during object allocation (step 1712) with terminating thereafter.

Figure 18:
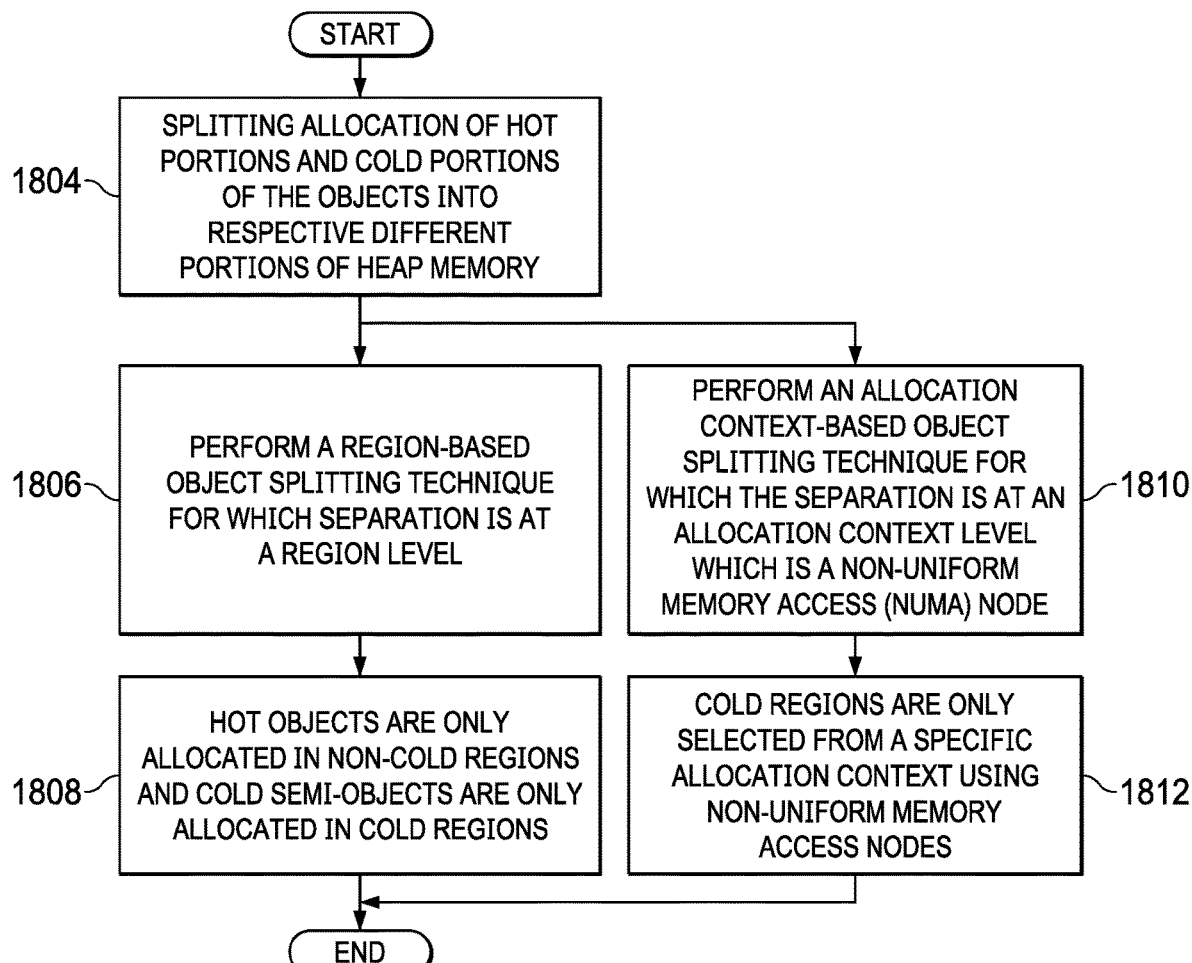
FIG. 18 is a flowchart of a process for splitting objects is depicted in accordance with an illustrative embodiment.

With reference to FIG. 18, a flowchart of a process for splitting objects is depicted in accordance with an illustrative embodiment. Process illustrated in FIG. 18 is an example of a process for object splitting in virtual machine and can be performed using object manager 212 in FIG. 2. The process in this flowchart is an example of the splitting operation described in step 1712 in FIG. 17.

The process begins by splitting allocation of hot portions and cold portions of the objects into respective different portions of heap memory (step 1804). The process uses one path in which the selected object splitting technique is configured to perform a region-based object splitting technique for which separation is at a region level (step 1806). Because region-based object splitting technique is selected, the process is configured so that hot objects are only allocated in non-cold regions and cold semi-objects are only allocated in cold regions (step 1808) with the process terminating thereafter.

The process using another path in which the selected object splitting technique is configured to perform an allocation context-based object splitting technique for which the separation is at an allocation context level which is a non-uniform memory access (NUMA) node (step 1810). Because allocation context-based object splitting technique is selected, the process is configured so that cold regions are only selected from a specific allocation context using non-uniform memory access nodes (step 1812) with the process terminating thereafter.

Thus, one illustrative example includes a computer-implemented method for object splitting in a managed runtime. In response to receiving information, for an executed application, about particular classes and associated non-static fields including names, types and modifiers, and field access frequency collected in a hash table, the computer-implemented method analyzes the information received according to predetermined criteria to created analyzed data. The analyzed data about the non-static fields is saved in a memory to identify, on subsequent executions, new layouts for objects of the executed application. The non-static fields including fields of super classes inside the objects are reordered, using the field access frequency, into a hot portion containing hot fields and a cold portion containing cold fields. A field is added, after and adjacent to the hot portion, to maintain an address of a first cold field in the cold portion of the object as a cold pointer. The object is split using a selected object splitting technique to create a hot-object and a cold semi-object during object allocation.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 19:
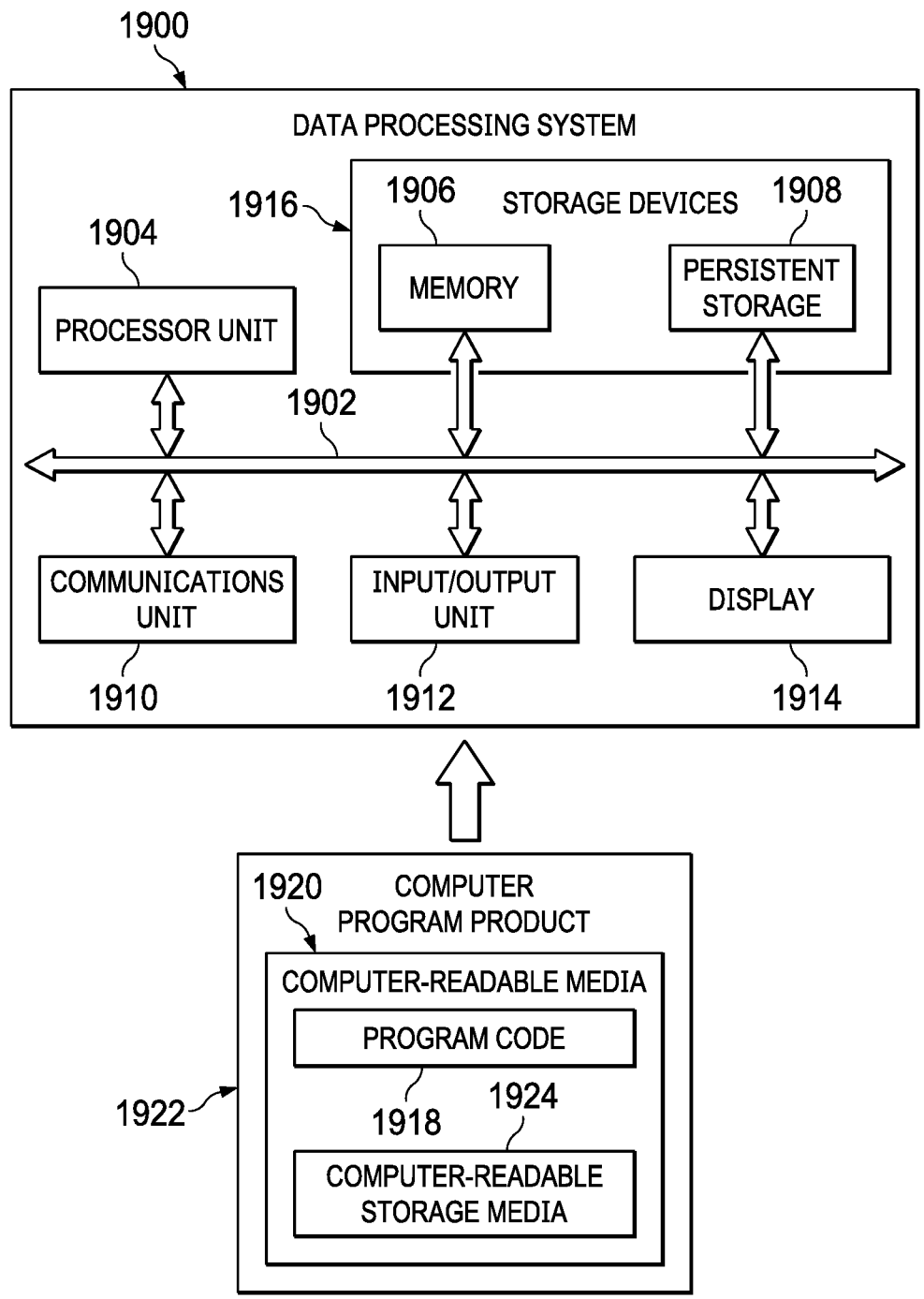
FIG. 19 is a block diagram of a data processing system in accordance with an illustrative embodiment.

Turning now to FIG. 19, a block diagram of a data processing system is depicted in accordance with an illustrative embodiment. Data processing system 1900 can be used to implement server computer 104, server computer 106, client devices 110, in FIG. 1. Data processing system 1900 can also be used to implement one or more data processing systems in computer system 208 and data processing system 300 in FIG. 3. In this illustrative example, data processing system 1900 includes communications framework 1902, which provides communications between processor unit 1904, memory 1906, persistent storage 1908, communications unit 1910, input/output (I/O) unit 1912, and display 1914. In this example, communications framework 1902 takes the form of a bus system.

Processor unit 1904 serves to execute instructions for software that can be loaded into memory 1906. Processor unit 1904 includes one or more processors. For example, processor unit 1904 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1904 can may be implemented using one or more heterogeneous processor systems in which a main processor is present with secondary processors on a single chip. As another illustrative example, processor unit 1904 can be a symmetric multi-processor system containing multiple processors of the same type on a single chip.

Memory 1906 and persistent storage 1908 are examples of storage devices 1916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices

1916 may also be referred to as computer-readable storage devices in these illustrative examples. Memory 1906, in these examples, can be, for example, a random-access memory or any other suitable volatile or non-volatile storage device. Persistent storage 1908 may take various forms, depending on the particular implementation.

For example, persistent storage 1908 may contain one or more components or devices. For example, persistent storage 1908 can be a hard drive, a solid-state drive (SSD), a flash memory, a rewritable optical disk, a rewritable magnetic tape, or some combination of the above. The media used by persistent storage 1908 also can be removable. For example, a removable hard drive can be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that can be connected to data processing system 1900. For example, input/output unit 1912 may provide a connection for user input through at least one of a keyboard, a mouse, or some other suitable input device. Further, input/output unit 1912 may send output to a printer. Display 1914 provides a mechanism to display information to a user.

Instructions for at least one of the operating system, applications, or programs can be located in storage devices 1916, which are in communication with processor unit 1904 through communications framework 1902. The processes of the different embodiments can be performed by processor unit 1904 using computer-implemented instructions, which may be located in a memory, such as memory 1906.

These instructions are referred to as program code, computer usable program code, or computer-readable program code that can be read and processed by a processor in processor unit 1904. The program code in the different embodiments can be embodied on different physical or computer-readable storage media, such as memory 1906 or persistent storage 1908.

Program code 1918 is located in a functional form on computer-readable media 1920 that is selectively removable and can be loaded onto or transferred to data processing system 1900 for execution by processor unit 1904. Program code 1918 and computer-readable media 1920 form computer program product 1922 in these illustrative examples. In the illustrative example, computer-readable media 1920 is computer-readable storage media 1924.

In these illustrative examples, computer-readable storage media 1924 is a physical or tangible storage device used to store program code 1918 rather than a medium that propagates or transmits program code 1918.

Alternatively, program code 1918 can be transferred to data processing system 1900 using a computer-readable signal media. The computer-readable signal media can be, for example, a propagated data signal containing program code 1918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1900 are not meant to provide architectural limitations to the manner in which different embodiments can be implemented. In some illustrative examples, one or more of the components may be incorporated in or otherwise form a portion of, another component. For example, memory 1906, or portions thereof, may be incorporated in processor unit 1904 in some illustrative examples. The different illustrative embodiments can be implemented in a data processing system including components in addition to or in place of those illustrated for data processing system 1900. Other components shown in FIG. 19 can be varied from the illustrative examples shown. The different embodiments can be implemented using any hardware device or system capable of running program code 1918.

Thus, illustrative embodiments of the present invention provide a computer implemented method, computer system, and computer program product for managing objects in a virtual machine. A frequency of access to fields in objects for an application is identified while the application runs in the virtual machine. An object in the objects is split into a hot object and a cold semi-object based on the frequency of access to the fields in the object as identified while the application runs in the virtual machine, wherein cache misses are reduced from splitting objects based of the frequency of access. Additional increases in performance can include reduce use of memory resulting from cold semi-objects not having a header. Further, changes to bytecode and source code are unnecessary.

The illustrative examples enable reducing cache misses by splitting objects into hot objects and cold semi-objects. The hots objects have a smaller size that allows for more hot objects to fit in a cache line. Further, cold semi-objects can be placed in to a cold area in heap memory such that fewer cache misses occur. Further, changes at least one of classes, source code, or bytecode can be avoided using the object splitting in the illustrative examples.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for managing objects in a virtual machine, the method comprising:

identifying, by a computer system, a frequency of access to fields in objects for an application while the application runs in the virtual machine;

splitting, by the computer system, an object in the objects into a hot object and a cold semi-object based on the frequency of access to the fields in the object as identified while the application runs in the virtual machine performed during at least one of an object allocation that allocates objects for the application and running of the application, wherein cache misses are reduced from splitting objects based on the frequency of access;

splitting, by the computer system, an allocation of hot objects from hot portions and cold semi-objects from cold portions of the objects into respective different portions of a heap memory; and creating, by the computer system at each global marking phase, a cold remembered-set for each of the cold portions that contain pointers to live split objects with a cold part residing at a cold portion.

2. The method of claim 1, wherein the application has completed running and wherein splitting the object in the objects into the hot object and the cold semi-object based on the frequency of access to the fields in the object as identified while the application runs in the virtual machine comprises:
  responsive to receiving information, for the application, about particular classes and associated non-static fields including names, types and modifiers, and the frequency of access to the fields, analyzing, by the computer system, the information received according to predetermined criteria to create analyzed data identifying the frequency of access to each of the fields;
  saving, by the computer system, the analyzed data about the non-static fields in a memory to identify, on subsequent running of the application, new layouts for the objects of the application;
  reordering, by the computer system, the non-static fields including fields of super classes inside the objects into a hot portion containing hot fields and a cold portion containing cold fields using the frequency of access to the fields;
  adding, by the computer system, a field, after and adjacent to the hot portion, to maintain an address of a first cold field in the cold portion of the object as a cold pointer; and
  splitting, by the computer system, the object using a selected object splitting technique to create a hot-object and a cold semi-object during an object allocation.

3. The method of claim 2, wherein the selected object splitting technique is a region-based object splitting technique in which hot objects are only allocated in non-cold regions and cold semi-objects are only allocated in cold regions.

4. The method of claim 2, wherein the selected object splitting technique is an allocation context-based object splitting technique in which cold regions are only selected from a specific allocation context using non-uniform memory access architecture nodes.

5. The method of claim 2 further comprising:
  modifying, by the computer system, an appropriation allocation context in which threads from hot contexts can only appropriate regions from hot contexts and threads from cold contexts can only appropriate regions from cold contexts.

6. The method of claim 1, wherein the cold semi-object does not have a header during an object allocation.

7. The method of claim 1 further comprising:
  performing, by the computer system, a garbage collection for cold regions in the heap memory in which cold regions having age zero are collected on each partial garbage collection; and
  performing, by the computer system, the garbage collection for remaining cold regions when a number of cold regions exceeds a predetermined threshold.

8. An object management environment comprising:
  a computer system that identifies a frequency of access to fields in objects for an application while the application runs in a virtual machine; splits an object in the objects into a hot object and a cold semi-object based on the frequency of access to the fields in the object as identified while the application runs in the virtual machine performed during at least one of an object allocation that allocates objects for the application and running of the application, wherein cache misses are reduced from splitting objects based on the frequency of access; splits an allocation of hot objects from hot portions and cold semi-objects from cold portions of the objects into respective different portions of a heap memory; and creates, at each global marking phase, a cold remembered-set for each of the cold portions that contain pointers to live split objects with a cold part residing at a cold portion.

9. The object management environment of claim 8, wherein in splitting the object in the objects into the hot object and the cold semi-object based on the frequency of access to the fields in the object as identified when the application was previously run in the virtual machine, the computer system:
  responsive to receiving information, for the application, about particular classes and associated non-static fields including names, types and modifiers, and the frequency of access to the fields, analyzes the information received according to predetermined criteria to created analyzed data;
  saves the analyzed data about the non-static fields in a memory to identify, when the application is subsequently run, new layouts for objects of the application;
  reorders the non-static fields including fields of super classes inside the objects into a hot portion containing hot fields and a cold portion containing cold fields using the frequency of access to the fields;
  adds a field, after and adjacent to the hot portion, to maintain an address of a first cold field in the cold portion of the object as a cold pointer; and
  splits the object using a selected object splitting technique to create a hot-object and a cold semi-object during an object allocation.

10. The object management environment of claim 9, wherein when the selected object splitting technique is a region-based object splitting technique, a separation is at a region level and when the selected object splitting technique is an allocation context-based object splitting technique, the separation is at an allocation context level which is a non-uniform memory access architecture node.

11. The object management environment of claim 10, wherein when the selected object splitting technique is a region-based object splitting technique, hot objects are only allocated in non-cold regions and cold semi-objects are only allocated in cold regions and when the selected object splitting technique is an allocation context-based object splitting technique, cold regions are only selected from a specific allocation context using non-uniform memory access architecture nodes.

12. The object management environment of claim 10, wherein the computer system performs a garbage collection for cold portions when cold portions having age zero are collected on each partial garbage collection and performs the garbage collection for remaining cold regions when a number of cold regions exceeds a predetermined threshold.

13. A computer program product for splitting objects in a virtual machine, the computer program product comprising:
  a computer-readable storage media;
  first program code, stored on the computer-readable storage media, for identifying a frequency of access to fields in objects for an application when the application runs in the virtual machine;
  second program code, stored on the computer-readable storage media, for splitting an object in the objects into a hot object and a cold semi-object based on the frequency of access to the fields in the object as identified when the application runs in the virtual machine performed during at least one of an object allocation that allocates objects for the application and running of the application, wherein cache misses are reduced from splitting objects based on the frequency of access;

third program code, stored on the computer-readable storage media, for splitting an allocation of hot objects from hot portions and cold semi-objects from cold portions of the objects into respective different portions of a heap memory; and fourth program code, stored on the computer-readable storage media, for creating, at each global marking phase, a cold remembered-set for each of the cold portions that contain pointers to live split objects with a cold part residing at a cold portion.

14. The computer program product of claim 13, wherein the second program code comprises:

further program code, stored on the computer-readable storage media, responsive to receiving information, for the application, about particular classes and associated non-static fields including names, types and modifiers, and frequency of access to the fields collected, for analyzing the information received according to pre-determined criteria to created analyzed data;

further program code, stored on the computer-readable storage media, for saving the analyzed data about the non-static fields in a memory to identify, when the application is subsequently run, new layouts for objects of the application;

further program code, stored on the computer-readable storage media, for reordering, using the frequency of access to the fields, the non-static fields including fields of super classes inside the objects into a hot portion containing hot fields and a cold portion containing cold fields;

further program code, stored on the computer-readable storage media, for adding a field, after and adjacent to the hot portion, to maintain an address of a first cold field in the cold portion of the object as a cold pointer; and further program code, stored on the computer-readable storage media, for splitting the object using a selected object splitting technique to create the hot object and the cold semi-object during an object allocation.

15. The computer program product of claim 14, wherein the further program code, stored on the computer-readable storage media, for splitting the object using a selected object splitting technique to create the hot object and the cold semi-object during object allocation comprises:

program code, stored on the computer-readable storage media, for splitting allocation of hot objects from hot portions and cold semi-objects from cold portions of the objects into respective different portions of the heap memory using the object splitting technique, wherein when the object splitting technique is a region-based object splitting technique, a separation is at a region level and when the object splitting technique is an allocation context-based object splitting technique, the separation is at an allocation context level which is a non-uniform memory access architecture node.

16. The computer program product of claim 14, wherein the further program code, stored on the computer-readable storage media, for splitting the object using a selected object splitting technique to create the hot object and the cold semi-object during the object allocation comprises:

program code, stored on the computer-readable storage media, for allocating hot objects only in non-cold regions and allocating cold semi-objects only allocated in cold regions using a first object splitting technique when the selected object splitting technique is a region-based object splitting technique.

17. The computer program product of claim 14, wherein when the selected object splitting technique is an allocation context-based object splitting technique, cold regions are only selected from a specific allocation context using non-uniform memory access architecture nodes.

\* \* \* \* \*